United States Patent
Sadavarte et al.

(10) Patent No.: US 10,824,522 B2
(45) Date of Patent: Nov. 3, 2020

(54) METHOD, APPARATUS, AND COMPUTER PROGRAM PRODUCT FOR GENERATING CONSISTENT SNAPSHOTS WITHOUT QUIESCING APPLICATIONS

(71) Applicant: Nutanix, Inc., San Jose, CA (US)

(72) Inventors: Mayur Vijay Sadavarte, Sunnyvale, CA (US); Monoreet Mutsuddi, San Jose, CA (US); Praveen Kumar Padia, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 25 days.

(21) Appl. No.: 15/981,873

(22) Filed: May 16, 2018

(65) Prior Publication Data

US 2019/0370128 A1     Dec. 5, 2019

Related U.S. Application Data

(60) Provisional application No. 62/591,092, filed on Nov. 27, 2017.

(51) Int. Cl.
*G06F 11/14* (2006.01)
*G06F 3/06* (2006.01)
*G06F 9/455* (2018.01)

(52) U.S. Cl.
CPC .......... *G06F 11/1484* (2013.01); *G06F 3/067* (2013.01); *G06F 3/0619* (2013.01);
(Continued)

(58) Field of Classification Search
CPC .. G06F 11/1484; G06F 3/0619; G06F 3/0665; G06F 3/067; G06F 9/45558;
(Continued)

(56) References Cited

U.S. PATENT DOCUMENTS 7,979,395 B1   7/2011   Aggarwal et al.
8,046,550 B2   10/2011  Feathergill
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Charles Rones
*Assistant Examiner* — Tong B. Vo
(74) *Attorney, Agent, or Firm* — Vista IP Law Group, LLP

(57) ABSTRACT

The present disclosure provides a method, apparatus, and computer program product for generating consistent snapshots without quiescing applications. The snapshots correspond to consistency groups that in turn correspond to one or more vDisks on one or more nodes. Some embodiments of the present disclosure address the problem of generating consistent backup snapshots that cover cases of multiple virtual machines (VMs) that operate in a multi-node distributed computing environment (e.g., in clusters) without quiescing the accessing entity(ies). In some embodiments, the process includes identification of a triggering snapshot event, disabling of write complete responses to requesting entities for the resources corresponding to the snapshot to be generated, generating snapshots while one or more additional write requests are received, and using one or more techniques to insure that all actions corresponding to the snapshotting function do not occur outside of a specified time frame.

27 Claims, 19 Drawing Sheets

(52) U.S. Cl.
CPC ........ *G06F 3/0665* (2013.01); *G06F 9/45558* (2013.01); *G06F 11/1464* (2013.01); *G06F 11/1469* (2013.01); *G06F 2201/815* (2013.01); *G06F 2201/84* (2013.01)

(58) Field of Classification Search
CPC ............. G06F 11/1464; G06F 11/1469; G06F 2201/815; G06F 2201/84; G06F 3/065; G06F 3/0617
See application file for complete search history.

(56) References Cited

U.S. PATENT DOCUMENTS

| | | | |
|---|---|---|---|
| 8,135,930 B1 | 3/2012 | Mattox et al. | |
| 8,151,263 B1 | 4/2012 | Venkitachalam et al. | |
| 8,166,265 B1 | 4/2012 | Feathergill | |
| 8,234,469 B2 | 7/2012 | Ranade | |
| 8,335,902 B1 | 12/2012 | Feathergill | |
| 8,364,858 B1 | 1/2013 | Martin et al. | |
| 8,549,518 B1 | 10/2013 | Aron et al. | |
| 8,601,473 B1 | 12/2013 | Aron et al. | |
| 8,656,386 B1 | 2/2014 | Baimetov | |
| 8,762,967 B2 | 6/2014 | Kim | |
| 8,850,130 B1 | 9/2014 | Aron et al. | |
| 8,914,595 B1 | 12/2014 | Natanzon | |
| 9,009,106 B1 | 4/2015 | Aron et al. | |
| 9,043,567 B1* | 5/2015 | Modukuri | G06F 16/00 711/162 |
| 9,069,708 B2 | 6/2015 | Gill et al. | |
| 9,135,127 B1* | 9/2015 | Havemose | G06F 11/1451 |
| 9,348,634 B2 | 5/2016 | Allen | |
| 9,377,964 B2 | 6/2016 | Sharma et al. | |
| 9,396,200 B2 | 7/2016 | Jacoby et al. | |
| 9,430,333 B2 | 8/2016 | D'amato et al. | |
| 9,501,233 B2 | 11/2016 | Harris et al. | |
| 9,547,562 B1 | 1/2017 | Feathergill et al. | |
| 9,588,870 B2 | 3/2017 | Marron et al. | |
| 9,772,866 B1 | 9/2017 | Aron et al. | |
| 9,823,973 B1 | 11/2017 | Natanzon | |
| 10,061,656 B2 | 8/2018 | Zou | |
| 10,423,609 B1* | 9/2019 | Strauss | G06F 16/27 |
| 2004/0143832 A1 | 7/2004 | Yamamoto et al. | |
| 2005/0055603 A1 | 3/2005 | Soran et al. | |
| 2006/0101189 A1 | 5/2006 | Chandrasekaran et al. | |
| 2007/0074208 A1 | 3/2007 | Ling | |
| 2007/0079298 A1 | 4/2007 | Tian | |
| 2007/0174915 A1 | 7/2007 | Gribble et al. | |
| 2007/0244938 A1 | 10/2007 | Micheal et al. | |
| 2008/0052331 A1 | 2/2008 | Ogawa et al. | |
| 2008/0065854 A1 | 3/2008 | Schoenberg et al. | |
| 2008/0115143 A1 | 5/2008 | Shimizu et al. | |
| 2008/0244028 A1 | 10/2008 | Le | |
| 2009/0125678 A1 | 5/2009 | Tokuda et al. | |
| 2009/0260007 A1 | 10/2009 | Beaty et al. | |
| 2010/0011178 A1 | 1/2010 | Feathergill | |
| 2010/0077142 A1* | 3/2010 | Fienblit | G06F 11/1466 711/118 |
| 2010/0077165 A1 | 3/2010 | Lu et al. | |
| 2010/0162242 A1 | 6/2010 | Grouzdev | |
| 2010/0287407 A1* | 11/2010 | Basu | G06F 11/2094 714/6.12 |
| 2010/0299309 A1 | 11/2010 | Maki et al. | |
| 2011/0047340 A1 | 2/2011 | Olson et al. | |
| 2011/0107052 A1 | 5/2011 | Narayanasamy | |
| 2011/0154378 A1 | 6/2011 | Kishan et al. | |
| 2011/0219201 A1* | 9/2011 | Ranade | G06F 16/1727 711/162 |
| 2011/0307531 A1 | 12/2011 | Gaponenko et al. | |
| 2012/0005668 A1 | 1/2012 | Serizawa | |
| 2012/0117299 A1 | 5/2012 | Waldspurger | |
| 2012/0144391 A1 | 6/2012 | Ueda | |
| 2012/0167082 A1 | 6/2012 | Kumar | |
| 2012/0188592 A1 | 7/2012 | Handley | |
| 2012/0278799 A1 | 11/2012 | Starks et al. | |
| 2012/0331462 A1 | 12/2012 | Falko | |
| 2013/0179574 A1 | 7/2013 | Calder et al. | |
| 2013/0198489 A1 | 8/2013 | Branson et al. | |
| 2013/0227558 A1 | 8/2013 | Du | |
| 2014/0195753 A1 | 7/2014 | Khatri et al. | |
| 2014/0229949 A1 | 8/2014 | Cai | |
| 2014/0282824 A1 | 9/2014 | Lango et al. | |
| 2014/0317265 A1 | 10/2014 | James et al. | |
| 2014/0325170 A1 | 10/2014 | Aswathanarayana et al. | |
| 2014/0359043 A1 | 12/2014 | Gao et al. | |
| 2014/0365740 A1 | 12/2014 | Vasilyev et al. | |
| 2015/0180714 A1 | 6/2015 | Chunn | |
| 2015/0188775 A1 | 7/2015 | Van Der Walt | |
| 2015/0248402 A1 | 9/2015 | Patterson, III | |
| 2015/0317177 A1 | 11/2015 | Hussain et al. | |
| 2016/0004451 A1 | 1/2016 | Lakshman et al. | |
| 2016/0054774 A1* | 2/2016 | Song | G06F 1/3203 713/320 |
| 2016/0124764 A1 | 5/2016 | Nithrakashyap et al. | |
| 2016/0124972 A1 | 5/2016 | Jain et al. | |
| 2016/0202916 A1 | 7/2016 | Cui et al. | |
| 2016/0203013 A1 | 7/2016 | Bayapuneni et al. | |
| 2016/0292074 A1* | 10/2016 | Awasthi | G06F 13/4027 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Nov. 15, 2018 for related U.S. Appl. No. 14/206,924, 16 pages.
Notice of Allowance dated Dec. 10, 2018 for related U.S. Appl. No. 15/178,504, 8 pages.
Non-final Office Action dated Jun. 4, 2015 for related U.S. Appl. No. 13/926,921.
Final Office Action dated Dec. 22, 2015 for related U.S. Appl. No. 13/926,921.
International Search Report and Written Opinion dated May 30, 2014 for related PCT Patent Application No. PCT/US13/78389.
Non-final Office Action dated Mar. 12, 2015 for related U.S. Appl. No. 13/918,660.
Final Office Action dated Aug. 31, 2015 for related U.S. Appl. No. 13/918,660.
Non-final Office Action dated Jan. 6, 2016 for related U.S. Appl. No. 13/928,097.
Final Office Action dated May 10, 2016 for related U.S. Appl. No. 13/928,097.
International Search Report and Written Opinion dated Jun. 22, 2015 for related PCT Patent Application No. PCT/US2015/020144.

(56) References Cited

OTHER PUBLICATIONS

Non-final Office Action dated Sep. 28, 2015 for related U.S. Appl. No. 14/206,924.
Final Office Action dated May 19, 2016 for related U.S. Appl. No. 14/206,924.
Non-final Office Action dated Jun. 3, 2016 for related U.S. Appl. No. 14/278,429.
Non-final Office Action dated Jun. 7, 2016 for related U.S. Appl. No. 13/918,660.
Advisory Action dated Aug. 5, 2016 for related U.S. Appl. No. 14/206,924.
Non-final Office Action dated Aug. 11, 2016 for related U.S. Appl. No. 13/926,921.
Final Office Action dated Oct. 3, 2016 for related U.S. Appl. No. 13/918,660.
Xiao, et al., "Implementaion and Performance Evaluation of Two Snapshot Methods on iSCSI Target Storages", 2006, 11 pages.
Xiv Storage Reinvented, Snapshots Reinvented IBM XIV Storage System, Copyright IBM Corporation 2008, 17 pages.
Pai, Vivek, "COS 318: Operation Systems Snapshot and NFS", Computer Science Department, Princeton University, 2011, 24 pages.
Agarwal, et al., "Snapshots in Hadoop Distributed File System", 2011, 5 pages.
Navarro, et al., "FuSnap: Fuzzy Control of Logical Volume Snapshot Replication for Disk Arrays", Copyright 2010, 9 pages.
Sankaran et al., "Volume Shadow Copy Service", Storage Environment, Power Solutions, Mar. 2004, 4 pages.
"CA ARCserve Backup for Windows", Microsoft Volume Shadow Copy Service Guide r15, Copyright 2010.
Overland Storage, "Hardware Provider for Microsoft Volume Shadow Copy Service (VSS) User Guide", Ultamus Raid, Copyright 2008, 20 pages.
IBM, "IBM XIV Provider for Microsoft Windows Volume Shadow Copy Service" Version 2.4.0, Release Notes, Copyright 2009, 2013, 18 pages.
Fujitsu Limited, "VSS Backup Solution for Exchange Server 2007 and Symantec Backup Exec 12.5 using ETERNUS VSS Hardware Provider" System Configuration Guide, Copyright 2009, 45 pages.
Final Office Action dated Nov. 30, 2016 for related U.S. Appl. No. 14/278,429.
Notice of Allowance and Fee(s) due dated Jan. 25, 2017 for related U.S. Appl. No. 13/918,660.
Final Office Action dated Mar. 2, 2017 for related U.S. Appl. No. 13/926,921.
Notice of Allowance dated Mar. 9, 2017 for related U.S. Appl. No. 14/278,429.
Notice of Allowance dated Mar. 27, 2017 for related U.S. Appl. No. 13/928,097.
Advisory Action dated May 25, 2017 for related U.S. Appl. No. 13/926,921.
Non-Final Office Action dated Dec. 14, 2017 for related U.S. Appl. No. 15/178,504.
Li et al. "iROW: An Efficient Live Snapshot System for Virtual Machine Disk", 2012 IEEE, pp. 376-383.
Yu et al. "SNPdisk: An Efficient Para-Virtualization Snapshot Mechanism for Virtual Disks in Private Clouds", 2011 IEEE, pp. 20-26.
Chuang et al. "Generating Snapshot Backups in Cloud Virtual Disks", 2014 IEEE, pp. 1860-1863.
Extended European Search Report dated Oct. 16, 2017 for EP Application No. 15760880.3, 10 pages.
Final Office Action dated Jul. 12, 2018 for related U.S. Appl. No. 15/178,504.
[Nutanix-078] U.S. Appl. No. 15/160,347, filed May 20, 2016, 62 pages.
European Office Action dated Mar. 26, 2019 for related EP Application No. 15760880.3.
Non-Final Office Action dated May 15, 2019 for related U.S. Appl. No. 15/178,504.
Final Office Action dated Aug. 8, 2019 for related U.S. Appl. No. 14/206,924.
Cano, I. et al., "Curator: Self-Managing Storage for Enterprise Clusters", 14th USENIX Symposium on Networked Systems Design and Implementation, NSDI '17, (Mar. 27, 2017).
Notice of Allowance dated Dec. 3, 2019 for related U.S. Appl. No. 15/178,504.
Kangarlou et al. "Taking Snapshots of Virtual Networked Environments", 2007 ACM, 3 pages.
Huang et al. "VMCSnap: Taking Snapshots of Virtual Machine Cluster with Memory Deduplication", 2014 IEEE, pp. 314-319.
Non-Final Office Action dated Dec. 12, 2019 for related U.S. Appl. No. 15/660,490.

\* cited by examiner

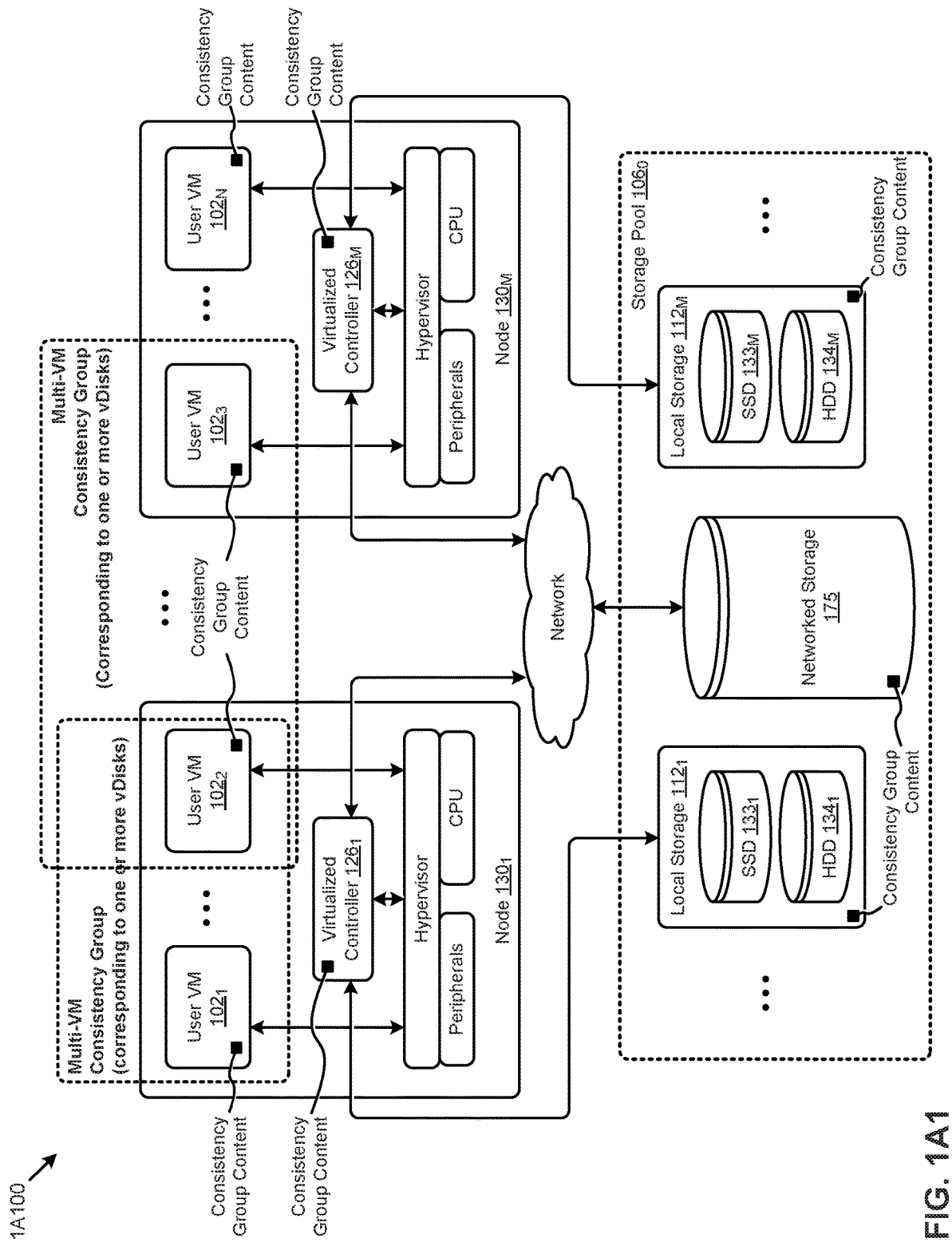
FIG. 1A1

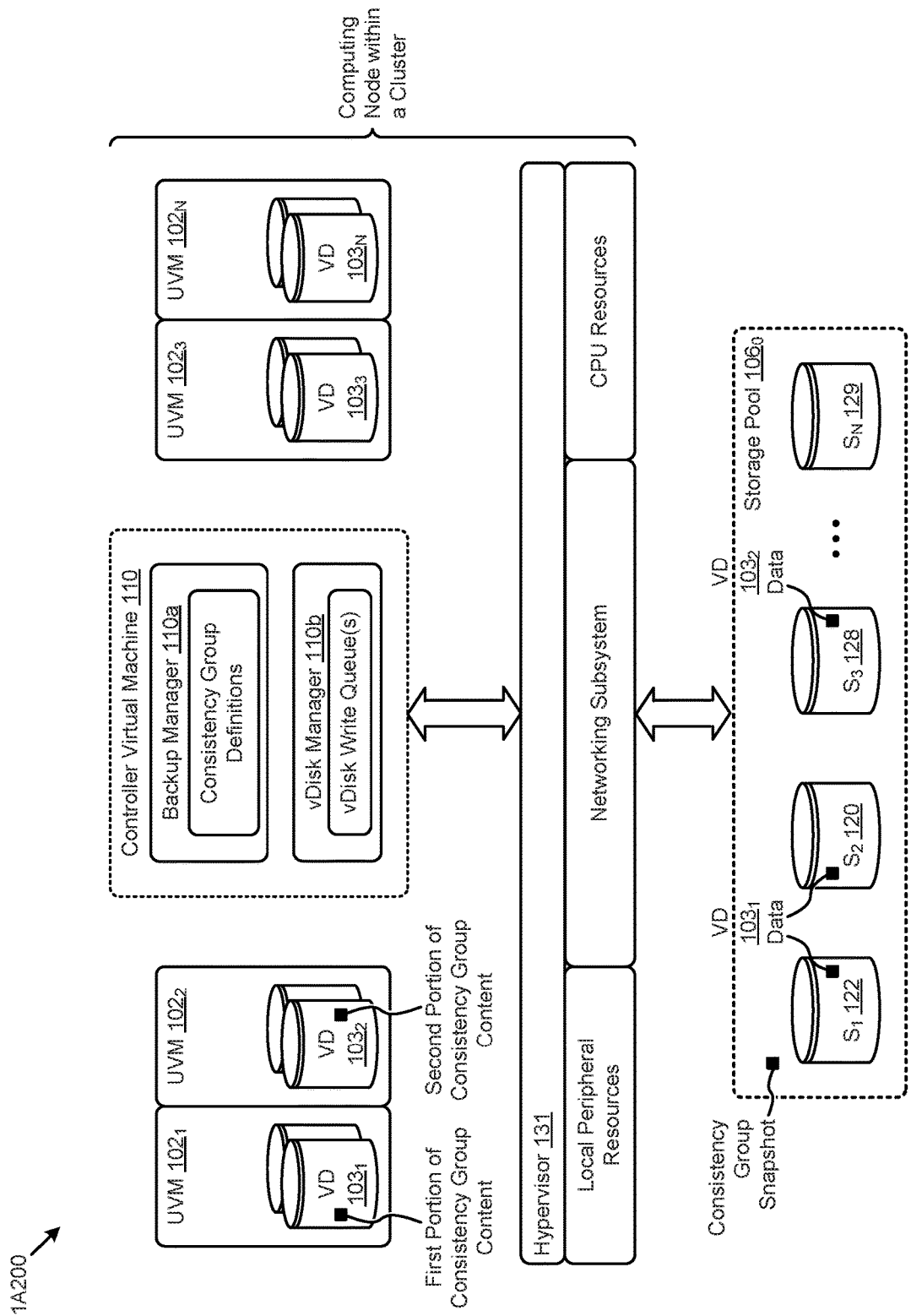
FIG. 1A2

METHOD, APPARATUS, AND COMPUTER PROGRAM PRODUCT FOR GENERATING CONSISTENT SNAPSHOTS WITHOUT QUIESCING APPLICATIONS

CROSS-REFERENCE TO RELATED APPLICATIONS

The present application claims the benefit of priority to U.S. Provisional Application No. 62/591,092, filed on Nov. 27, 2017, which is hereby incorporated by reference in its entirety.

FIELD

This disclosure relates to disaster recovery techniques, and more particularly to techniques for generating consistent snapshots without quiescing applications

BACKGROUND

In many computing environments, virtual machines are used to implement services and applications. These virtual machines are normally associated with one or more virtual disks, and in some cases the same virtual disk is accessible by two or more virtual machines.

To provide for capturing state information, current processes block access to these resources when performing snapshotting operations—e.g. each application that accesses a resource is quiesced before capturing a snapshot. Unless the data of all virtual machines in a consistency group are captured in a at a consistent state, a state of corruption may occur when that snapshot is restored, e.g., for a disaster recovery. This can result in a computing environment restored from the corrupted snapshot which might not function as intended, might not function at all, or even might corrupt stored data. Disaster recovery plans need is a way to identify a consistent state before taking snapshots of the data that is used by virtual machines.

However, blocking access to resources causes deleterious effects to performance. For instance, quiescing applications takes some amount of time. Additionally, snapshotting, only after quiescing, takes more time. Furthermore, releasing the quiescing then takes still more time. Thus, it would be beneficial to provide an approach for snapshotting without quiescing applications.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in methods, apparatus, and computer program products for generating consistent snapshots without quiescing applications, which techniques advance the relevant technologies to address technological issues with legacy approaches.

More specifically, the present disclosure provides for snapshots of consistency groups corresponding to one or more vDisks on one or more nodes without quiescing applications. Certain embodiments are directed to technological solutions for deployment of agents throughout multi-cluster environments where the agents coordinate multiple virtual machines to identify a consistent state for generation of snapshots, which embodiments advance the relevant technical fields as well as advancing peripheral technical fields.

The disclosed embodiments modify and improve over legacy approaches. In particular, the herein-disclosed techniques provide technical solutions that address the technical problems attendant to generation of consistency group backup snapshots when multiple virtual machines are used to implement an application without quiescing applications. Such technical solutions serve to reduce waste of computing resources such as for computer memory, for computer processing power, and unused communications cycles. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage backup and recovery snapshotting.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 depicts an example environment 1A100 in which techniques for generating snapshots can be performed.

FIG. 1A2 depicts backup manager coordination 1A200 to implement saving of data using consistent snapshots FIG. 2 depicts a flowchart showing a consistency group snapshot approach as used when generating consistency group snapshots.

DETAILED DESCRIPTION

Figure 2:
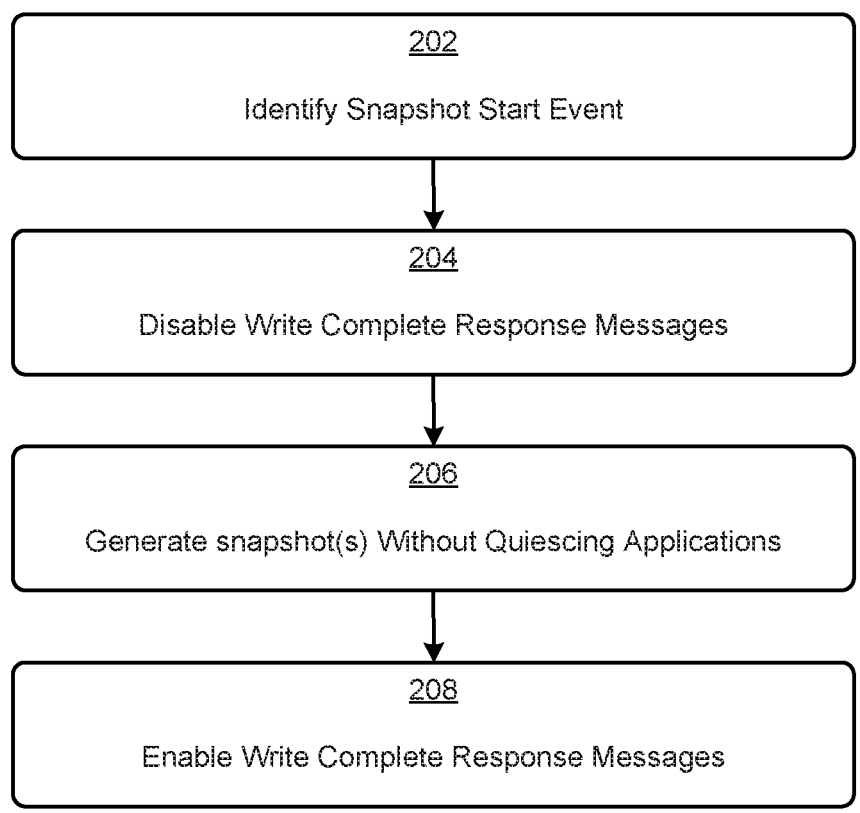

The present disclosure provides a detailed description of techniques used in methods, apparatus, and computer program products for generating consistent snapshots without quiescing applications. Some embodiments of the present disclosure address the problem of generating consistent snapshots when a consistency group corresponds to a plurality of resources and a plurality of nodes.

Overview

Some embodiments of the present disclosure address the problem of generating consistent backup snapshots that cover cases of multiple virtual machines (VMs) that operate in a multi-node distributed computing environment (e.g., in clusters) without quiescing the accessing entity(ies).

In some embodiments, the process is distributed across multiple resource, where one resource triggers the initiation of a snapshot process for a consistency group, another resource manages the snapshotting process for the consistency group, the members of the consistency group provide for generation of snapshots of the different resources of the consistency group, and the managing resource determines whether the corresponding snapshots should be committed or discarded based on one or more communications with management elements of the members of the consistency group. In some embodiments, the aforementioned resources may comprise different or the same node(s).

In some embodiments, the process includes identification of a triggering snapshot event, disabling of write complete responses to requesting entities for the resources corresponding to the snapshot to be generated, generating snapshots while one or more additional write requests are received, and using one or more techniques to insure that all actions corresponding to the snapshotting function do not occur outside of a specified time frame.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A1 depicts an example environment 1A100 in which techniques for generating snapshots can be performed. As an option, one or more variations of environment 1A100 or any aspect thereof may be implemented in the context of the architecture and functionality of the embodiments described herein. The environment 1A100 or any aspect thereof may be implemented in any environment.

FIG. 1A1 shows computing nodes (e.g., node $130_1$, node $130_M$) that are composed of real hardware components. Any number of single computing nodes can be organized into an array or cluster of nodes. Any node within a cluster of nodes can access storage devices in storage pool $106_0$ using any combinations of local storage access (see local storage $112_1$ and local storage $112_M$) and/or node-specific networking subsystem functions to access the storage pool $106_0$, through the shown network, to access the networked storage 175. The local storage in the storage pool can be local storage comprising solid-state storage devices (SSDs) (e.g., SSD $133_1$, SSD $133_M$) and/or can be hard drive storage devices (HDDs) (e.g., HDD $134_1$, HDD $134_M$), or combinations thereof. A user virtual machine (e.g., user VM $102_1$, user VM $102_2$, user VM $102_3$, . . . , user VM $102_N$) can access any of the foregoing devices of the storage pool through a virtualized storage controller (e.g., virtualized controller $126_1$, virtualized controller $126_M$).

The environment 1A100 shown in FIG. 1A1 is example of computing platforms that form virtualized computers (e.g., virtual machines, VMs). As shown, a plurality of user virtual machines (e.g., user VM $102_1$, user VM $102_2$, user VM $102_3$, . . . , user VM $102_N$) that execute on top of a hypervisor. The hypervisor abstracts node-specific computing hardware (e.g., the shown CPU, peripherals, etc.) to provide an abstracted or virtual view of said computing hardware to the user virtual machines.

Any one or more user VMs can be configured to perform some function or application. For example, a single user VM might be configured to serve as a "Windows 10 desktop" in a virtualized system. Alternatively, two or more user VMs might be configured to each perform respective aspects of an application. For example, a first user VM might be configured to collect a set of data, and other user VMs might be configured to operate over the collected data. The collected set of data might be partitioned such that multiple user VMs operate over respective subsets of the set of data collected by the first user VM. Any user VM can receive and/or store and/or generate application content. Such application content can be sent to the storage pool (e.g., through a virtualized controller that performs storage I/O to and from the storage pool).

In some cases, an application or virtual machine stores data within different groups or arrangements (e.g. vDisks as is discussed below) accessible by one or more VMs whether on the same or different nodes. For instance, VMs $102_1$ and $102_2$ both operate on a shared set of data, represented by "consistency group content" as illustrated. This, consistency group content may pass through the virtualized controller $126_1$ to provide for reading and writing of the consistency group content and for exchange of the consistency group content between the nodes such as through a network. Additionally, the VMs could be located on different nodes of the cluster as illustrated with VMs $102_2$ and $102_3$. Furthermore, in some embodiments multiple vDisks have dependency relationships where interrelated data is stored across different vDisks comprising a consistency group, where a consistency group comprises a set of interrelated vDisks where a virtual machine or combination of virtual machines depend on such data. For instance, one or more vDisks corresponding to one or more virtual machines that operate using some shared data, such as a first vDisk corresponding to a first dataset, and a second vDisk corresponding to a second dataset where the second dataset depends on the first dataset.

For a snapshot to be usable (e.g. for it to be formed such that it can be used to restore a state), the content of a respective consistency group should be captured such that the data is consistent (e.g. accurately captures the correct data at a given point during runtime) to be useable for backed-up resilience of the system and/or as a part of a disaster recovery plan. In some cases, a backup manager is employed to perform backup operations from time to time, possibly on a backup schedule. Such a backup manager and techniques for coordination of a backup among a plurality of VMs is shown and discussed as pertains to FIG. 1A2.

FIG. 1A2 depicts backup manager coordination 1A200 to implement saving of data using consistent snapshots. As an option, one or more variations of backup manager coordination 1A200 or any aspect thereof may be implemented in the context of the architecture and functionality of the embodiments described herein. The backup manager coordination 1A200 or any aspect thereof may be implemented in any environment.

Any user VM might allocate one or more virtual disks (e.g., VD $103_1$, VD $103_2$, VD $103_3$, ..., VD $103_N$). In some cases, a user VM might self-allocate any number of virtual disks, and in some cases (e.g., when two or more user VMs implement a single application) two or more virtual machines might share access to a single virtual disk. Any combination of any of the foregoing computing elements can be used to form a computing node (as shown), which in turn can access the storage pool $106_0$. Such a storage pool may comprise any number of storage areas (e.g., $S_1$ 122, $S_2$ 120, $S_3$ 128, ..., $S_N$ 129, etc.). Content that is derive from or is accessed by a user VM can be stored in one or more of the storage areas, which can include a series of blocks that combine to form non-volatile representations of the contents of the virtual disks (see VD $103_1$ data and VD $103_2$ data).

A list of blocks may be included in a point-in-time snapshot of vDisks in any particular consistency group. For example, in a consistency group comprising vDisk $103_{1-2}$ a first portion of consistency group content is logically located in vDisk $103_1$ while a second portion of consistency group content is logically located in vDisk $103_2$. In actuality, each portion of the respective vDisk data is stored on physical media within the storage pool $106_0$ and is managed by a vDisk manager 110b using at least a vDisk write queue(s).

A backup manager 110a can access blocks from any virtual disk and can interface with any storage device to materialize any content. A backup manager can determine blocks to be included in a snapshot using a consistency group definition to identify appropriate vDisk(s) for generation of a snapshot(s). In some cases, a backup manager can facilitate flushing of content from any volatile location (e.g., from cache or from a virtual machine's in-memory data structures). As one example, a backup manager can issue commands to the VMs of an application group and the constituent VMs can perform respective flushing of data from volatile storage areas. The flushing serves to save data stored in volatile areas to non-volatile areas (e.g., in the storage pool $106_0$).

In some embodiments, a backup manager can be implemented in whole or in part as a virtualized controller. A virtualized controller can take the form of a virtual machine (e.g., running in conjunction with a hypervisor 131) or can take the form of a container (e.g., a Docker container that does not directly rely on hypervisor services).

A backup manager 110a is configured to take snapshots. Such a backup manager retains or has access to a set of consistency group definitions. For example, generating a snapshot of a particular group of vDisks $103_1$ and $103_2$ corresponding to UVM1 $102_1$ and UVM2 $102_2$. The set(s) of vDisks that are identified to be within a consistency group can be codified into the consistency group definitions. The corresponding user machines can be hosted on a single node or can be distributed across a set of nodes (e.g., see the multi-VM consistency group across two or more nodes as depicted in FIG. 1A1). Moreover, a single vDisk can be accessible wholly within a single user virtual machine, or can be accessible across a plurality of virtual machines. The snapshots can be represented in various ways. For instance, each snapshot may consist of a set of data corresponding to a list of data objects that make up the snapshot (e.g. included/highest SVN for each vDisk in the consistency group). In some embodiments, the snapshots may comprise collections/copies of the data that comprises the snapshot. For instance, a first snapshot comprises a complete snapshot as embodied in a copy of all data at a point in time. A subsequent snapshot, captured at a later point in time, comprises a difference set where the subsequent snapshot includes a copy of all data generated or modified since the previous snapshot was captured. Furthermore, in some embodiments each snapshot may comprise a list of objects and a reference to a previous snapshot, where the current snapshot comprises the combination of all previous snapshots and the current snapshot. In some embodiments, the snapshot(s) may comprise one or more vectors corresponding to the consistency group stored separately or together.

FIG. 2 depicts a flowchart showing a consistency group snapshot approach as used when generating consistency group snapshots. As an option, one or more variations of the consistency group snapshot formation approach or any aspect thereof may be implemented in the context of the architecture and functionality of the embodiments described herein. The consistency group snapshot formation approach or any aspect thereof may be implemented in any environment.

At step 202, a snapshot event is identified. Snapshot events can be identified in response to various events, e.g. the expiration of a timer, upon a scheduled time, in a circular manner where a queue has entries for all snapshot consistency groups for snapshots that will be serially generated, in response to a user input, in response to a specified event, or any combination thereof. Regardless of what triggers the snapshot event, as is discussed more thoroughly below, the process identifies the event which triggers the start of one or more flows to complete a snapshot process for at least one consistency group (e.g. using the consistency group definitions of the backup manager 110a).

In response to identifying the snapshot event, write complete response messages are disabled at 204 for consistency group members (e.g. for the vDisk write queue(s) in vDisk manager 110b). For example, a consistency group receives a disable write complete response messages command, where the consistency group comprises two vDisks and each vDisk is managed by a different node. Disabling write complete response messages stops the process from sending confirmation of a write operation to a corresponding entity (ies) (e.g. a virtual machine operating system (OS) process or an application on the virtual machine). Because these processes (e.g. the VM OS process and applications) do not send subsequent writes that depend on a previous write without confirmation of previous writes, the consistency group data will correspond to a shared/specific point in time. Thus, a snapshot so generated is viable for use in restoration of a machine at the snapshots shared/specific point in time. Write complete response messages serve to provide the expected response to a process thread associated with a write operation—e.g. the write complete response messages tells a process that the write was completed successfully. In this context, the write complete response message confirms that the written data was successfully placed in a temporary volatile or non-volatile memory storage location, or within the storage pool.

Subsequently, a snapshot(s) is generated at 206 without quiescing applications—instead the write complete response messages are disabled. For example, the vDisk manager(s) 110b disables corresponding write response messages for corresponding vDisk write queues and the backup manager 110a provides for generation of the corresponding snapshots. This is in stark contrast to past techniques, where one or more modules would be maintained at the virtual machine to provide for quiescing of the corresponding element (e.g. the application) such that the application stops transmitting write requests. Instead of including a module on the virtual machine to quiesce applications, the present technique controls the flow of completion messages to the application. Control of the response messages results in the application not receiving complete messages, and thus does not generate/transmit write requests that are dependent on data that is associated with unconfirmed write requests. This avoids the overhead required for maintaining the quiescence modules and the time spent on quiescing the applications. Furthermore, this allows the VM(s) or application(s) to continue requesting writes corresponding to any confirmed writes.

The snapshot is then stored in a storage location, preferably one that is anticipated to not share a common failure modality with the members of the consistency group. For example, a well-recognized failure mode in disaster scenarios is the failure of a power supply or power source. Therefore, given recognition of this possible failure scenario, it would make sense for the snapshot(s) for nodes attached to a first power supply or source to be stored in a storage location that is associated with a second power supply or source.

Any suitable approach can be used to take a snapshot of a storage device. For example, consider the situation where the application and/or the VM has either an in-memory state or on-disk state that needs to be snapshotted. The in-memory and/or on-disk data for the application/VM might be stored in a set of one or more virtualized storage components. In some embodiments, a copy of the data within the virtualized storage components is made and/or identified to perform the snapshot. To explain further, consider if the resources for the application are stored as virtual disks ("vDisks"), which are logical representations of storage space compiled from one or more physical underlying storage devices. A file comprises data within one or more vDisks that are associated with the file. Metadata may be used to map the vDisks to the underlying physical storage devices. For instance, for each consistency group, a snapshot having one or more subsets corresponding to each vDisk is generated. In some embodiments, the snapshot may comprise a copy of the data representing the vDisk, a list of blocks or storage locations that comprise the data of the vDisk, a vector representing the sequence control number (SCN) numbers that make up the snapshot, or metadata representing the vDisk, or any combination thereof.

More information and approaches to implement virtual disks and any associated metadata is described in U.S. Pat. No. 8,601,473 issued on Dec. 3, 2013 and U.S. Pat. No. 8,850,130 issued on Sep. 30, 2014, both of which are hereby incorporated by reference in their entirety.

At 208 the write complete response messages are enabled—e.g. by the backup manager 110a for the corresponding vDisk manage 110b vDisk write queue(s). In some embodiments, the write requests are held in a buffer pending the completion of the write requests, and thus would not trigger a write complete response message. In some embodiments, write requests are processed normally but for delaying write complete response messages for those write requests until the enable write complete update has occurred at 208. Furthermore, in some embodiments the write requests are held in a queue and written to memory normally, but corresponding write complete response messages are held in a write complete response queue until write complete response messages are enabled. In some embodiments, the buffer comprises volatile memory, non-volatile memory, or some combination thereof.

Figure 3:
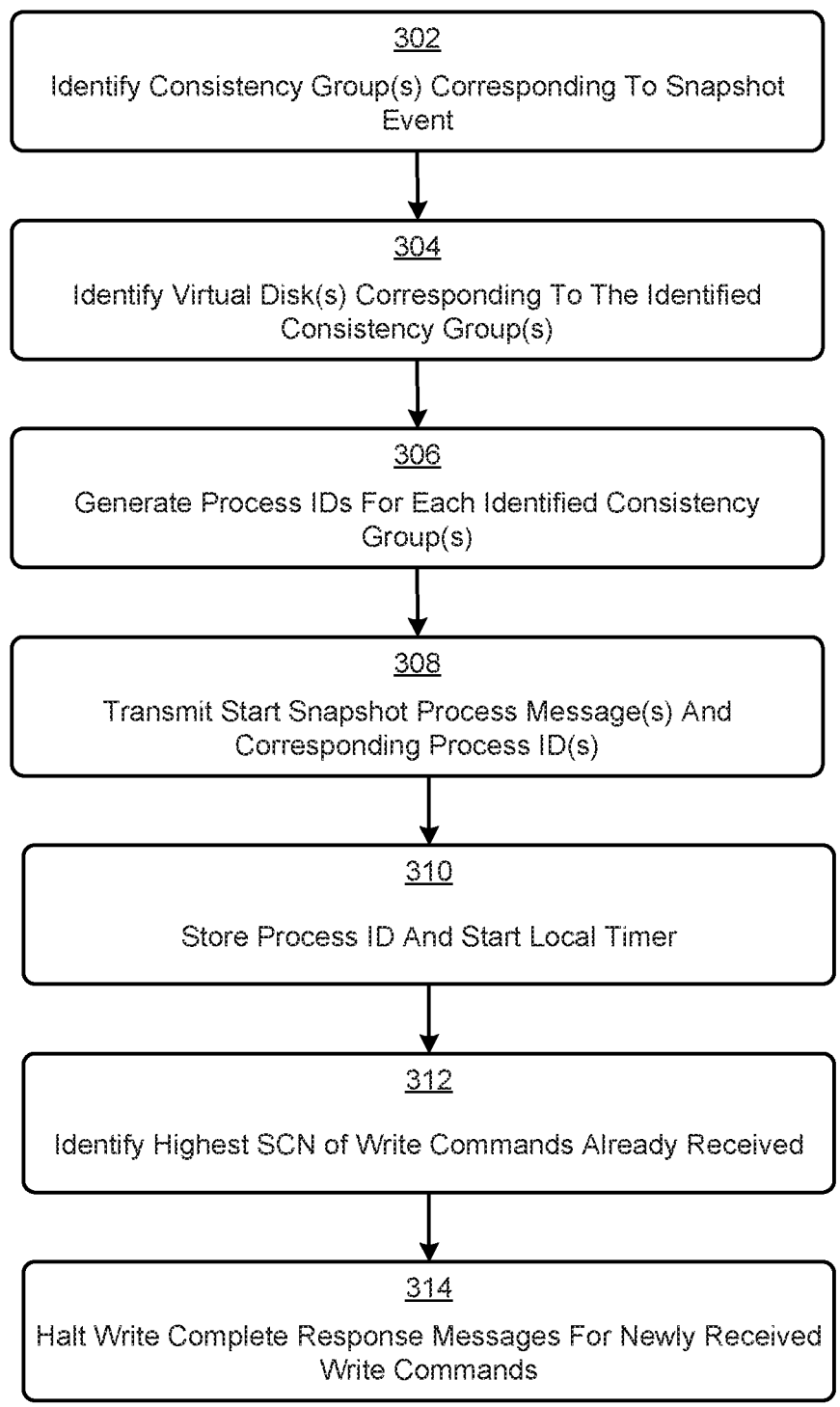
FIG. 3 depicts a flowchart for the disable write complete response messages step illustrated in FIG. 2 according to some embodiments.

FIG. 3 depicts a flowchart for the disable write complete response messages step illustrated in FIG. 2 according to some embodiments. As an option, one or more variations for disabling write complete response messages or any aspect thereof may be implemented in the context of the architecture and functionality of the embodiments described herein. The disabling of write complete response messages or any aspect thereof may be implemented in any environment.

The process starts at 302, where one or more consistency group(s) corresponding to the identified snapshot event of 202 are identified. For instance, a snapshot event might correspond to a single consistency group, where the consistency group itself corresponds to one or more resources to be snapshotted (e.g. one or more vDisks). In some embodiments, the snapshot might correspond to a plurality of consistency groups whether by category, customer, function, feature, or any other characteristic. Furthermore, the snapshot event might correspond to generation of snapshots for a plurality of consistency groups or even groups of groups. Regardless of whether the snapshot event corresponds to a one or to multiple consistency groups, the process at 302 will determined the consistency groups that corresponding to the request. For example, a controller virtual machine 110 receiving snapshot event information performs a lookup operation on the consistency group definitions at the backup manager 110a to identify a corresponding consistency group(s). Additionally, the controller virtual machine 110 may comprise a leader virtual machine for all nodes of the plurality of nodes of the cluster, for a subset of the nodes of the plurality of nodes, a dynamically or statically assigned leader node for a particular event, or a randomly selected node. Furthermore, the controller virtual machine is selectable based at least in part of a workload or a corresponding relationship with a resource to be snapshotted.

At 304 the virtual disk(s) corresponding to the consistency group are identified. For instance, the vDisk(s) corresponding to the consistency group is identified from the consistency group definitions comprising an object, dataset, list, struct, or metadata. In some embodiments, the consistency group data is generated using a read/write sniffer that identifies read/write relationships between resources (e.g. VMs or applications).

At 306 a process ID is generated for each identified consistency group and stored at the backup manager (e.g. backup manager 110a) of the corresponding controller virtual machine (e.g. controller virtual machine 110). The process ID is transmitted, as part of or in the form of, a start snapshot process message at 308. In some embodiments, the message is transmitted internally within the controller VM to a different portion of the controller VM and/or to one or more other controller VMs on other nodes of the plurality of nodes that make up the cluster.

Regardless of the mechanism of transfer at 308, the message causes at 310 the start of a local timer and the association of the local timer with the process ID at each controller VM of each node corresponding to the consistency group. As will be discussed below, the local timer and ID is used to determine whether the snapshot process completed successfully and to insure that the process fails gracefully in the event of failure of the management process.

At 312, a highest sequence control number (SCN) for commands already received is identified, whether at the level of the vDisk manager 110b or at the level of respective vDisk write queues within the vDisk manager. In some embodiments, the SCN value is used as the cutoff point for halting write complete response messages for any newly received write commands at 314, e.g. write commands with a higher SCN then the one previously identified. In some embodiments, the SCN number is assigned to the request upon receipt at the vDisk write queue(s). In some embodiments, the SCN number corresponds to the only commands that have been both received, and stored in a non-volatile storage location (e.g. a cache, log, or storage pool), as opposed to a volatile storage location (e.g. RAM).

Furthermore, the process illustrated in FIG. 3 may be executed at one or more virtual machines, where 302, 304, 306, and 308 correspond to a first virtual machine, and 310, 312, and 314 correspond to one or more second virtual machines. Additionally, the first virtual machine could comprise one or the one or more second virtual machines or could comprise a different virtual machine from the one or more second virtual machines. In some embodiments, multiple snapshot processes are initiated at the same time, where multiple virtual machines corresponding to the first virtual machine operate concurrently, and where the multiple sets of virtual machines correspond to at least one respective virtual machine of the one or more second virtual machines. The respective virtual machines of the one or more second virtual machines may also overlap, where the different sets may share one or more virtual machines. Furthermore, each virtual machine corresponding to a first virtual machine can manage one or multiple snapshot processes.

Figure 4A:
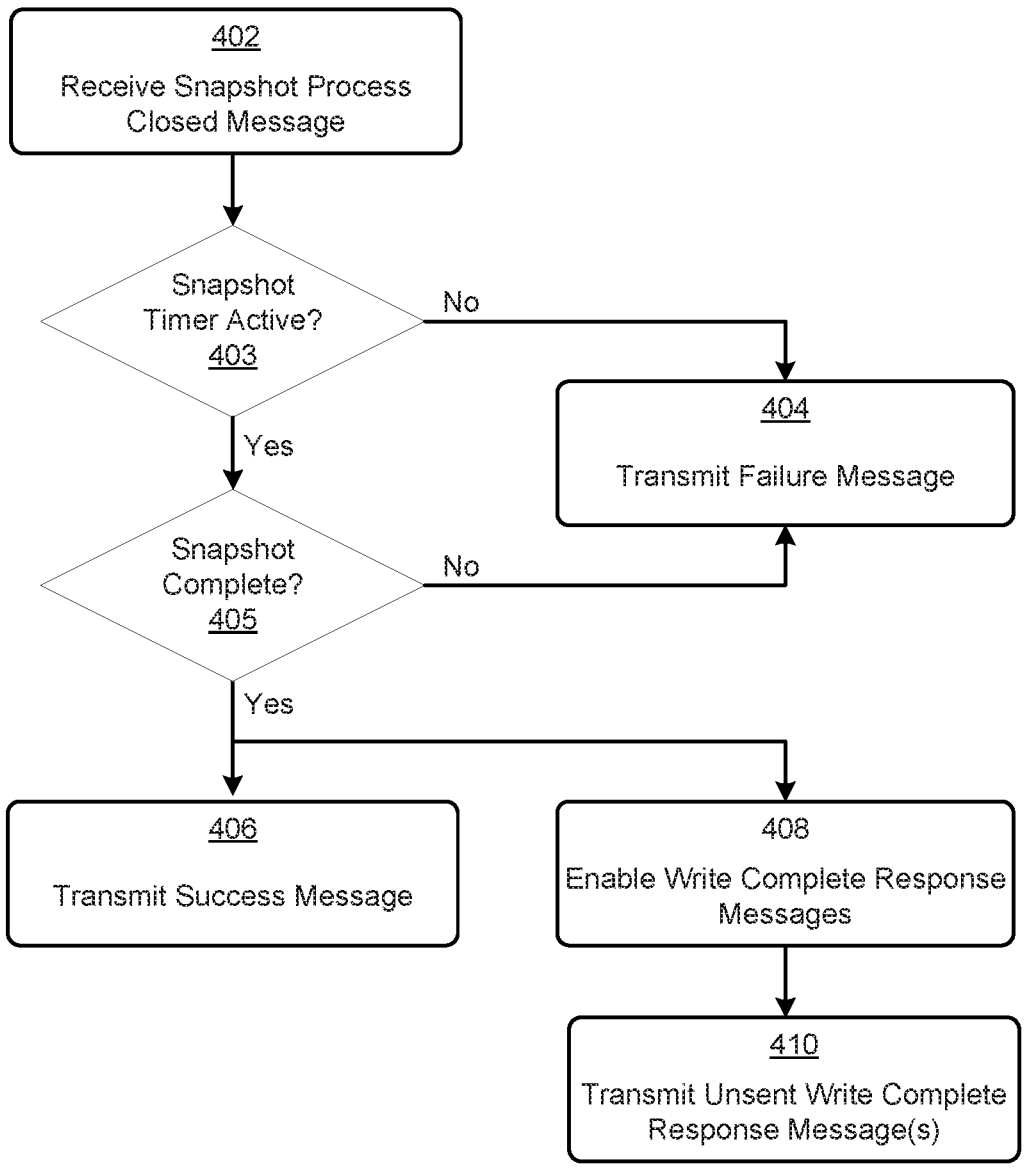
FIGS. 4A-C depicts a flowchart corresponding to enabling write complete response messages in FIG. 2 according to some embodiments.
Figure 4B:
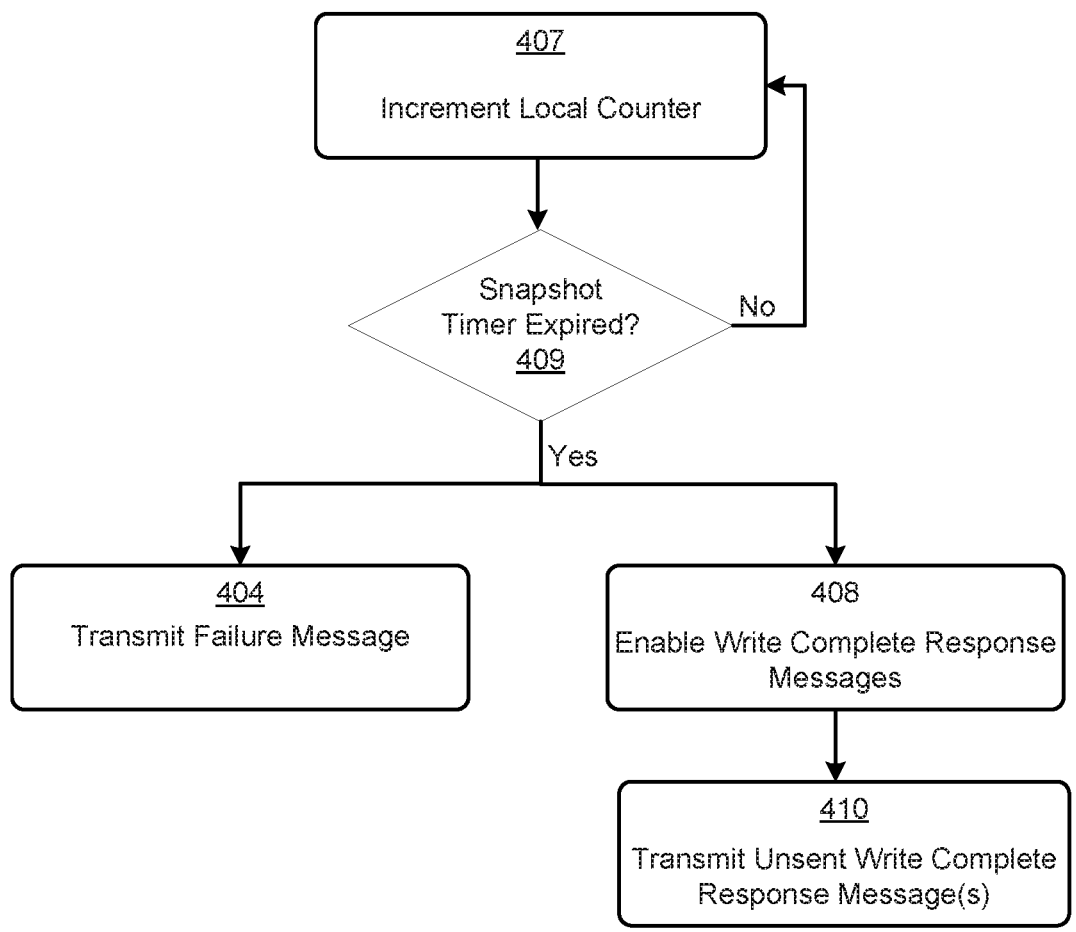
Figure 4C:
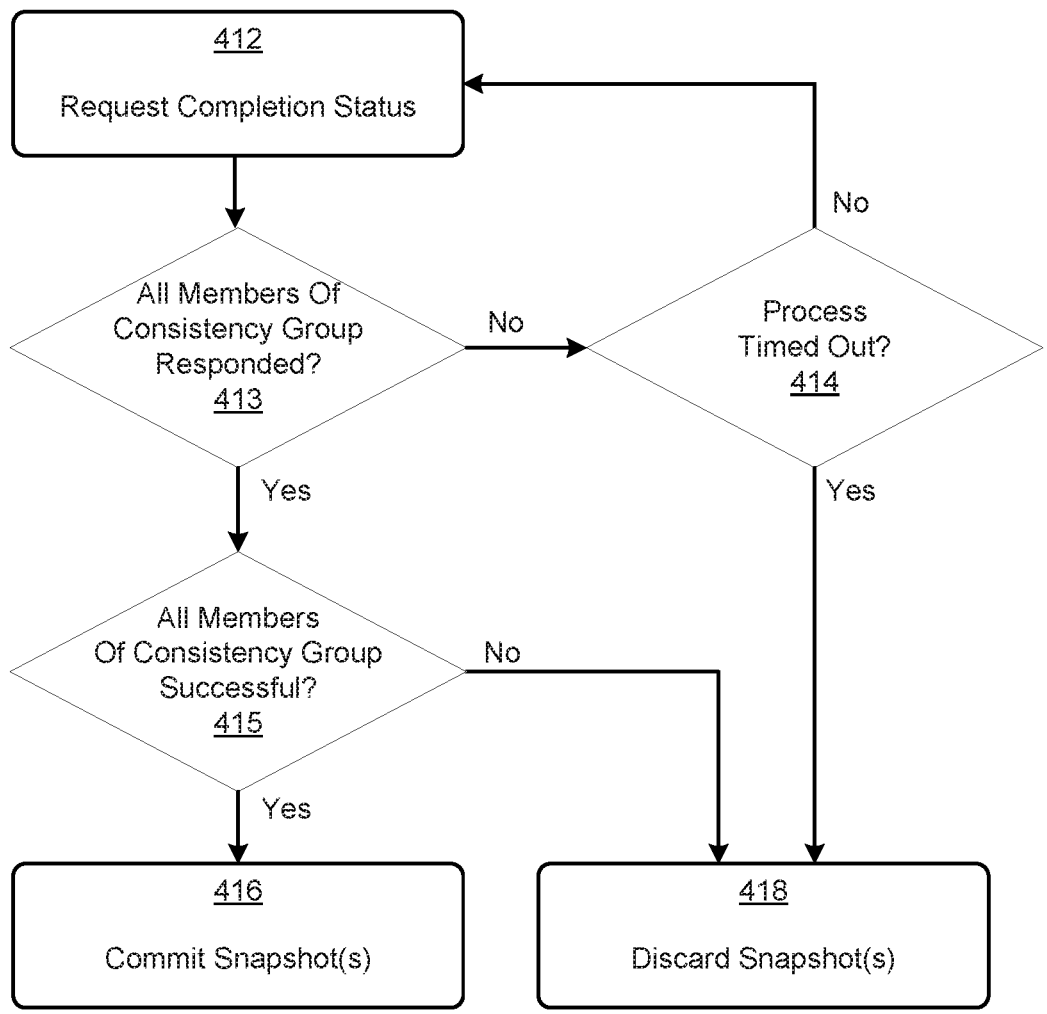

FIGS. 4A-C depicts a flowchart corresponding to enabling write complete response messages in FIG. 2 according to some embodiments. As an option, one or more variations for enabling write complete response messages or any aspect thereof may be implemented in the context of the architecture and functionality of the embodiments described herein. The enabling write complete response messages or any aspect thereof may be implemented in any environment.

FIG. 4A shows a flow illustrating operations in response to receiving a snapshot process close message.

The process starts are 402 where a snapshot process close message is received (e.g. from the backup manager 110a). In operation, each member of a consistency group will receive a corresponding snapshot process close message at the members/nodes corresponding to the consistency group and then perform the steps 402-406, 408, and 410 as appropriate. In some embodiments, the snapshot process close message includes a process ID, where the ID was previously received when the snapshot process started. Furthermore, the process close message is transmitted by the same backup manager 110a that sent the snapshot process start message.

At 403 any local snapshot timers are checked to determine if they are both associated with the process ID and still active, where an active snapshot timer indicates that the process has not unexpectedly failed. For instance, if a corresponding node or controller virtual machine has crashed the corresponding snapshot timer (e.g. the timer previously started and associated with the snapshot process ID) would no longer be active. Thus, the snapshot timer provides for a way to verify that the controller VM continued to operate correctly during the snapshot period. Additionally, the snapshot timer provides a mechanism to address possible failures of the leader controller VM (e.g. the controller VM that originally issued the process ID and start message) which will be discussed further in regard to FIG. 4B.

If the snapshot timer is not active, as determined at 403, the process continues at 404 where a failure message is returned. However, if the corresponding snapshot timer is still active, as determined at 403, the process continues at 406, 408, and 410. At, 406 a success message will be sent in response to the received snapshot process close message, and the write complete response messages that were disabled will be enabled and transmitted at 408 and 410 respectively. For instance, at 406 a transmit success message may be sent to the leader controller virtual machine that has the backup manager 110a that initially sent the snapshot start message, where the success message includes the process ID, a completion time, or some combination thereof.

Additionally, the process will trigger the enabling of write complete response messages at 408 for the corresponding vDisk manager 110b or vDisk write queue(s) associated with the consistency group. Subsequently, any queued or unsent write complete response message(s) are then allowed to be transmitted normally to the original write requestor (see transmit unsent write complete response message(s) 410)—e.g. VM or application. In some embodiments, the transmission of unsent write complete response messages is subject to all write complete response messages being enable, where another snapshot process may also be asserting a disable flag on write complete response messages for the same vDisk write queue.

FIG. 4B shows a flow illustrating operations in response to incrementing a local counter. The local counter provides for timing out the snapshot process at respective nodes corresponding to the consistency group, where timing out the snapshot process triggers a failure message, the response messages, and transmits unsent responses.

The process starts are 407 where the local counter is incremented—e.g. increment each clock cycle, alternating clock cycles, or once for a number of cycles. In some embodiments, the counter is decremented to a specified value (e.g. zero). Subsequently, the value of the timer is analyzed at 409 where a specified value indicates that the timer has expired. For instance, the timer expires at zero or the timer expires when it reaches a specified value greater than zero—e.g. a number of clock cycles corresponding to the closest number of clock cycles to one millisecond. If the timer is expired the process continues at 404, 408, and 410 as described previously.

FIG. 4C shows a flow illustrating operations corresponding to requesting completion status. Here, the requested completion status corresponds to the enabling of write complete response messages from the managing controller virtual machine backup manager.

The process starts at 412 where one or more completion status request messages are sent to the controller virtual machines corresponding to the consistency group. The completion messages comprise the received snapshot process close message previously discussed.

After the completion status request messages are sent at 412 the process continues at 413, where a determination is made as to whether all members of the consistency group have responded.

If some members of the consistency group have not yet responded the process goes to 414, where it is determined whether the process has timed out (e.g. using a global process timer associated with the consistency group snapshot process). If the process has not timed out the flow returns to 412, where either the completion status request messages are sent again, or a period of time is allowed to elapse before performing another check at 413.

If all members of the consistency group have responded, then a determination is made at 415 as to whether all members of the consistency group have reported success. If all members of the consistency group reported success (e.g. their corresponding timer(s) were active) the snapshot(s) for the consistency group can be committed at 416.

Figure 5:
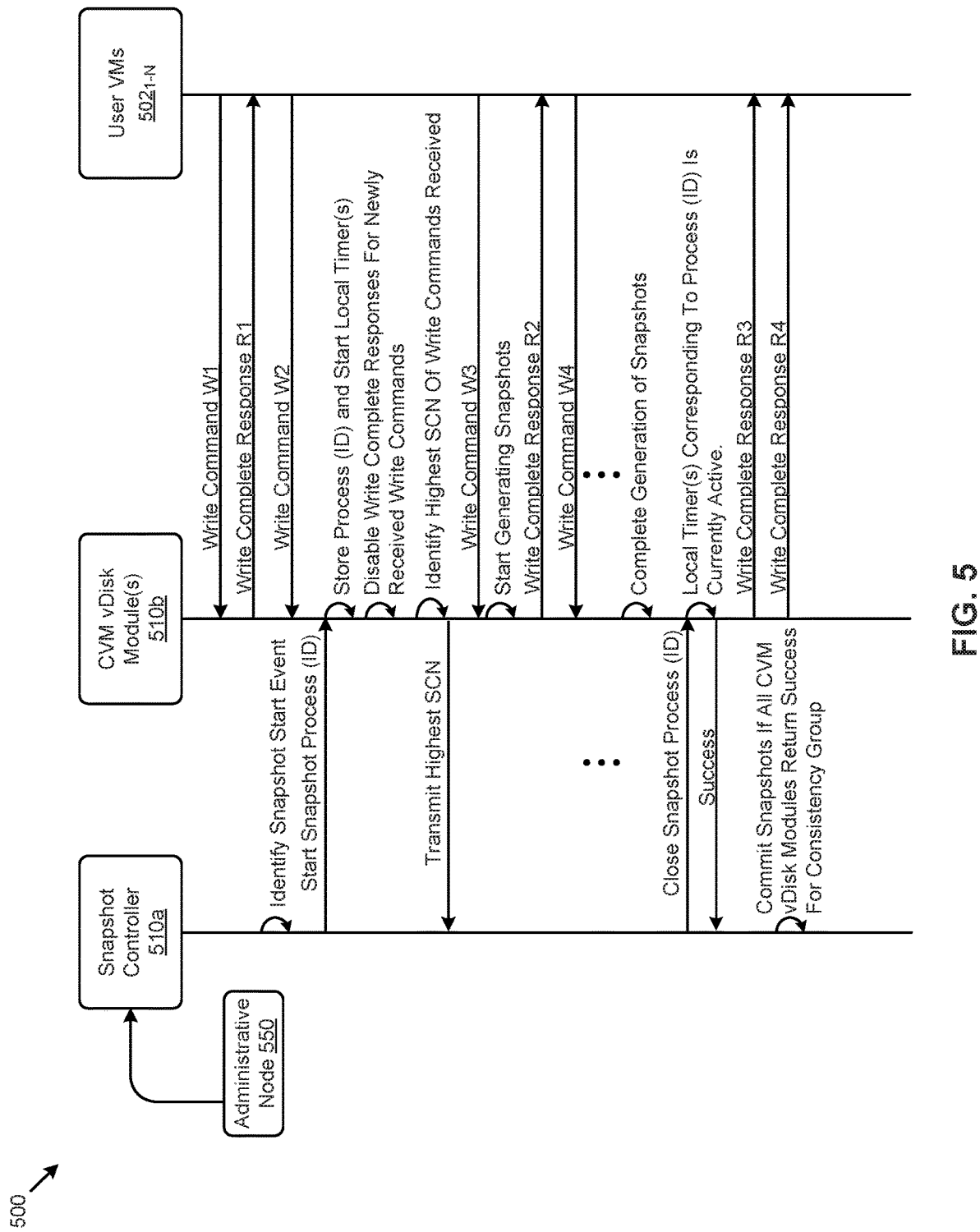
FIG. 5 depicts a protocol diagram according to some embodiments.

If either the process times out as determined at 414 or if any of the members of the consistency group did not report success, the process proceeds to 418 where the snapshot(s) are discarded. FIG. 5 provides an illustration of some of the aspects of FIGS. 2-4C in the form of a protocol diagram.

FIG. 5 depicts a protocol diagram according to some embodiments. As an option, one or more variations of the protocol diagram 500 or any aspect thereof may be implemented in the context of the architecture and functionality of the embodiments described herein. The protocol diagram 500 or any aspect thereof may be implemented in any environment.

The protocol diagram illustrates an administrative node 550, a snapshot controller 510a, CVM vDisk Module(s) 510b, and user VMs $502_{1-N}$. The administrative node 550 can be any node of the plurality of nodes of the cluster. The snapshot controller 510a corresponds to backup manager 110a. The CVM vDisk Module(s) 510b corresponds to the vDisk manager 110b, and the user VMs $502_{1-N}$ correspond to UVMs $502_{1-N}$.

As shown, the process includes an administrative node 550 that configures a snapshot event(s). For instance, a user accessing administrative service specifies a frequency of snapshot updates or by specifying any other parameters as previously discussed.

As illustrated, prior to a snapshot start event a write command (W1) is receive at a CVM vDisk module 510b corresponding to a particular consistency group from a user VM of the user VMs $502_{1-N}$ (e.g. to save data associated with an application). Subsequently, write command W1 is confirmed by a respective CVM vDisk module of the CVM vDisk module(s) 510b by write complete response R1, either before or after the write is committed to non-volatile storage (e.g. a cache log or storage pool $106_0$).

Subsequently, a snapshot start event is identified at snapshot controller 510a. However, before the snapshot controller sends a corresponding start snapshot process message including a process ID, an addition write command W2 is received at CVM vDisk module(s) 510b from a user VM of user VMs $502_{1-N}$. For the sake of illustration, we presume that all reads and writes correspond to the same consistency group. The snapshot controller 510a then sends that snapshot start message including the process ID as previous discussed—e.g. to the CVMs corresponding to the consistency group.

Upon receipt of the start snapshot message and process ID the respective CVMs of CVM vDisk module(s) 510b store the process ID, associate it with a local timer, and start the local timer. The local timer, at each respective CVM, specifies a time in which the snapshot process must be completed or otherwise causes the snapshot process to timeout as is discussed in regard to FIG. 4C. For example, the snapshot time is set to timeout in 1 millisecond. Write complete responses are also disabled for newly received write command, and the highest SCN of the write commands already received is recorded and transmitted to the snapshot controller 510a.

Subsequently, one or more additional write commands are received both before and after the snapshot generation process has completed (see write command W3 and W4 respectively). Furthermore, write response messages are transmitted for any writes that have an SCN that is less than or equal to the identified highest SCN, such as write command received before write complete responses are disabled. Thus, write complete response messages are allowed to continue to be transmitted to appropriate write requestors during the snapshot generation process (see write complete response R2). At some point in time snapshot process may complete successfully as illustrated here, where write command's W3 and W4 are unconfirmed but otherwise completed writes (e.g. the corresponding data has been committed to non-volatile storage but not yet confirmed to the requesting application).

Next, a close snapshot process message is transmitted to/from the snapshot controller 510a to the CVM vDisk module(s) 510b corresponding to the consistency group. In response to the close message, the CVM vDisk module(s) 510b corresponding to the consistency group confirm that the process ID corresponds to a currently active timer and responds with a success message (possible including the process ID) when the corresponding timer is currently active. Furthermore, the close message also triggers the enabling of the write complete response messages as illustrated in FIG. 4A.

Subsequently, the respective CVMs of CVM vDisk module(s) 510b will process any write complete response messages that have been held back (see write complete response R3 and R4). Additionally, the snapshot controller 510a will then determine whether the snapshot should be committed as illustrated in FIG. 4C, where the snapshot(s) are only committed if all CVMs associated with the consistency group reported success.

In some embodiments, the write commands are confirmed when stored in a volatile memory (e.g. cached in RAM), when stored in a non-volatile cache storage location (e.g. as represented by a log or cache in a reserved area of a storage device directly attached to a corresponding node), or when stored in a final storage location (e.g. storage pool). Furthermore, in some embodiments all write complete response messages are halted upon receipt of a start snapshot process message or only write complete response messages are sent for write complete response messages with SCN values equal to or less then the identified highest SCN. Furthermore, the highest SCN may comprise the highest SCN of any write command received for a respective vDisk, the highest SCN of write commands that have been stored in volatile memory, the highest SCN of write commands that have been stored in non-volatile memory. Thus, different combinations of write command confirmation policies, SCN identification policies, and write command halting policies provide different operating modes with different levels of conservatism.

ADDITIONAL EMBODIMENTS OF THE DISCLOSURE

Additional Practical Application Examples

FIGS. 6A-I provides an illustrative example of operation of vDisk write queue(s) for an example consistency group during a snapshot process. The example is merely illustrative and other partitions are possible.

Figure 6A:
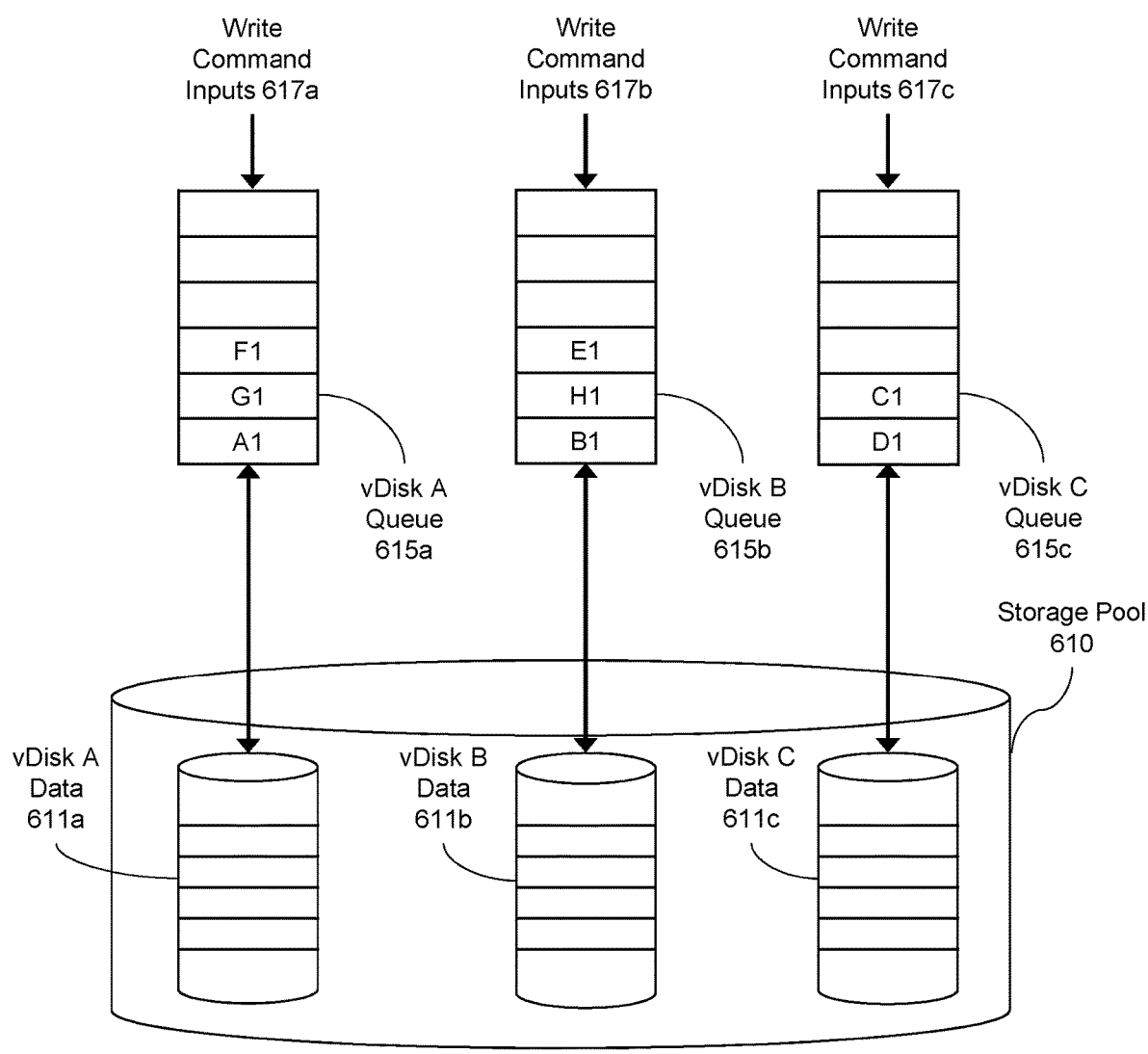
FIGS. 6A-I provides an illustrative example of operation of vDisk write queue(s) for an example consistency group during a snapshot process.

FIG. 6A illustrates and initial condition of a set of three write queues and three corresponding set of vDisk data in a storage pool. The write command vDisk queues 615a (write queues A-C) are managed by one or more vDisk managers such as vDisk manager 110b and correspond to the vDisk write queue(s) illustrated in FIG. 1A2. The vDisk write queues receive write commands/requests as inputs (see write command inputs 617a-c), queues those inputs when appropriate, and commits received writes to corresponding vDisk data areas (see vDisk Data 611a-c for A-C data) within a storage pool 610 corresponding to storage pool $106_0$. Furthermore, while the illustration includes a number of storage locations illustrated within the storage pool, the actual vDisk data may be distributed across any number of disks that comprise the storage pool and thus can logically be represented as contiguous stored data while in reality being stored in a non-contiguous manner (see e.g. consistency group content of FIG. 1A1 and VD $103_1$ data and VD $103_2$ data of FIG. 1A2).

FIG. 6A further illustrates an initial state of the queues 615a-c. As illustrated 615a includes A1, G1, and F1, 615b includes B1, H1, and E1, and 615c includes D1 and C1, where for illustration purposes the letters indicate the series of the respective writes and the number indicates the item in that series. Furthermore, the vDisks data 611a-c may corresponding to any number of other pieces of data already stored, but not illustrated, in the storage pool 610.

Figure 6B:
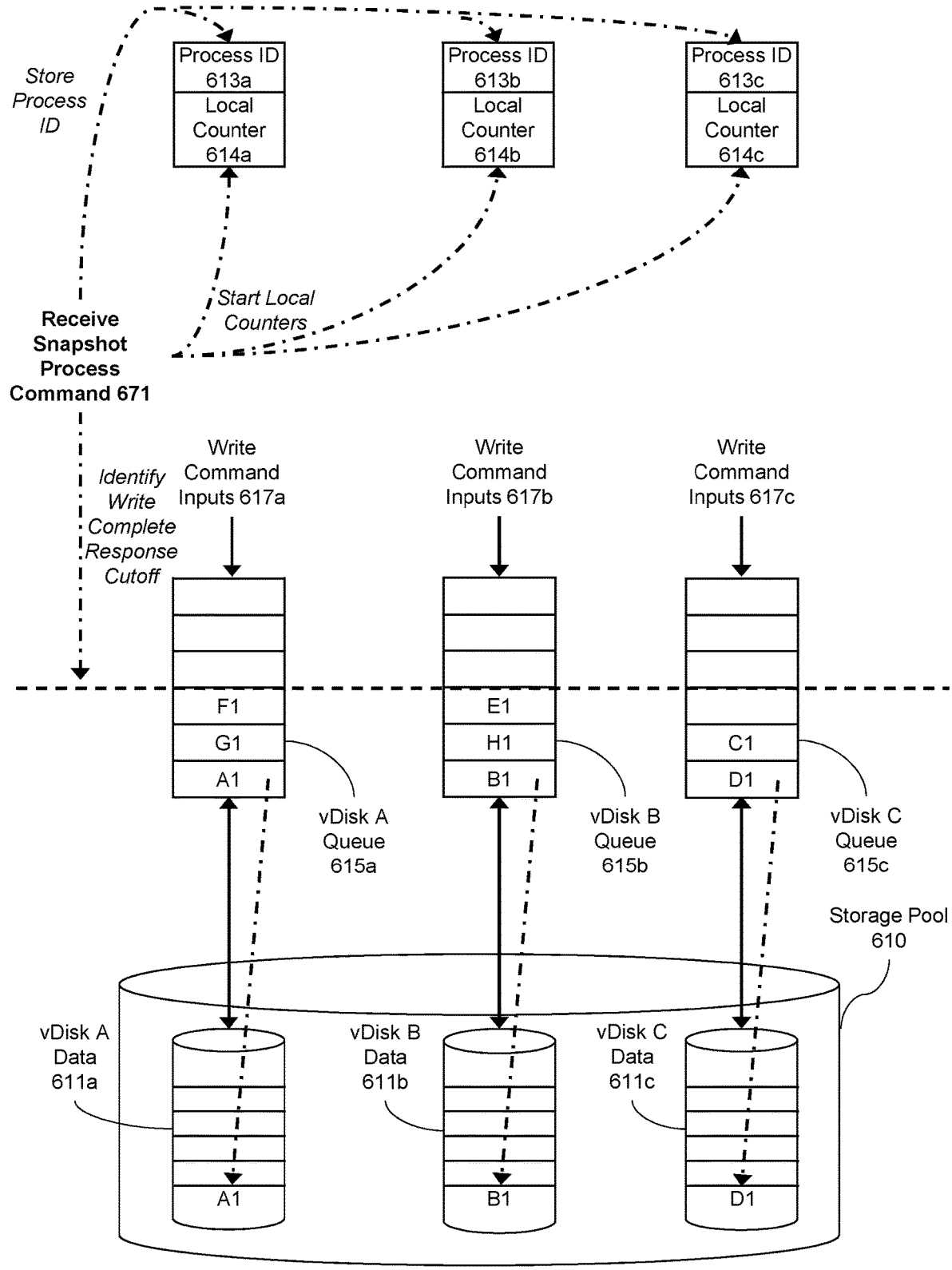

FIG. 6B illustrates a concurrent series of actions according to one embodiment. First, FIG. 6B illustrates writing data from the vDisk queues (615a-c) to vDisk storage locations (611a-c) in the storage pool 610. Second, FIG. 6B illustrates a series of actions triggered by receipt of a snapshot process command such as a snapshot start command.

As illustrated by the dashed and dotted lines, the first value in the queues (615a-c) are being copied to locations in the storage pool corresponding to respective vDisk data (611a-c). Data for write command A1 is copied from the vDisk A queue 615a to the vDisk A data 611a. Data for write command B1 is copied from the vDisk B queue 615b to the vDisk B data 611b. Data for write command D1 is copied from the vDisk C queue 615c to the vDisk C data 611c.

With regard to the second aspect, a snapshot process command 671 is received (e.g. a start snapshot command) including a process ID and corresponding to a consistency group comprising vDisks 611a-c. The command comprises a single command or multiple commands received by a backup manager(s) (e.g. backup manager 610a). The command 671 can also be received or forwarded in full or in part to respective vDisk manager(s) (e.g. vDisk manager 110b) to indicate the corresponding vDisks and queues, and to cause the identification of the write complete response cutoff point.

For instance, the illustration shows a horizontal dashed line across the vDisk queues 615a-c place above the previously/already received write commands. Furthermore, the command 671 also triggers the storing of the received process ID as process ID 613a-c and the starting of a local counter 614a-c that is associated with the stored process ID. The local counter can be used to manage a timeout process as discussed in FIG. 4B above.

Figure 6C:
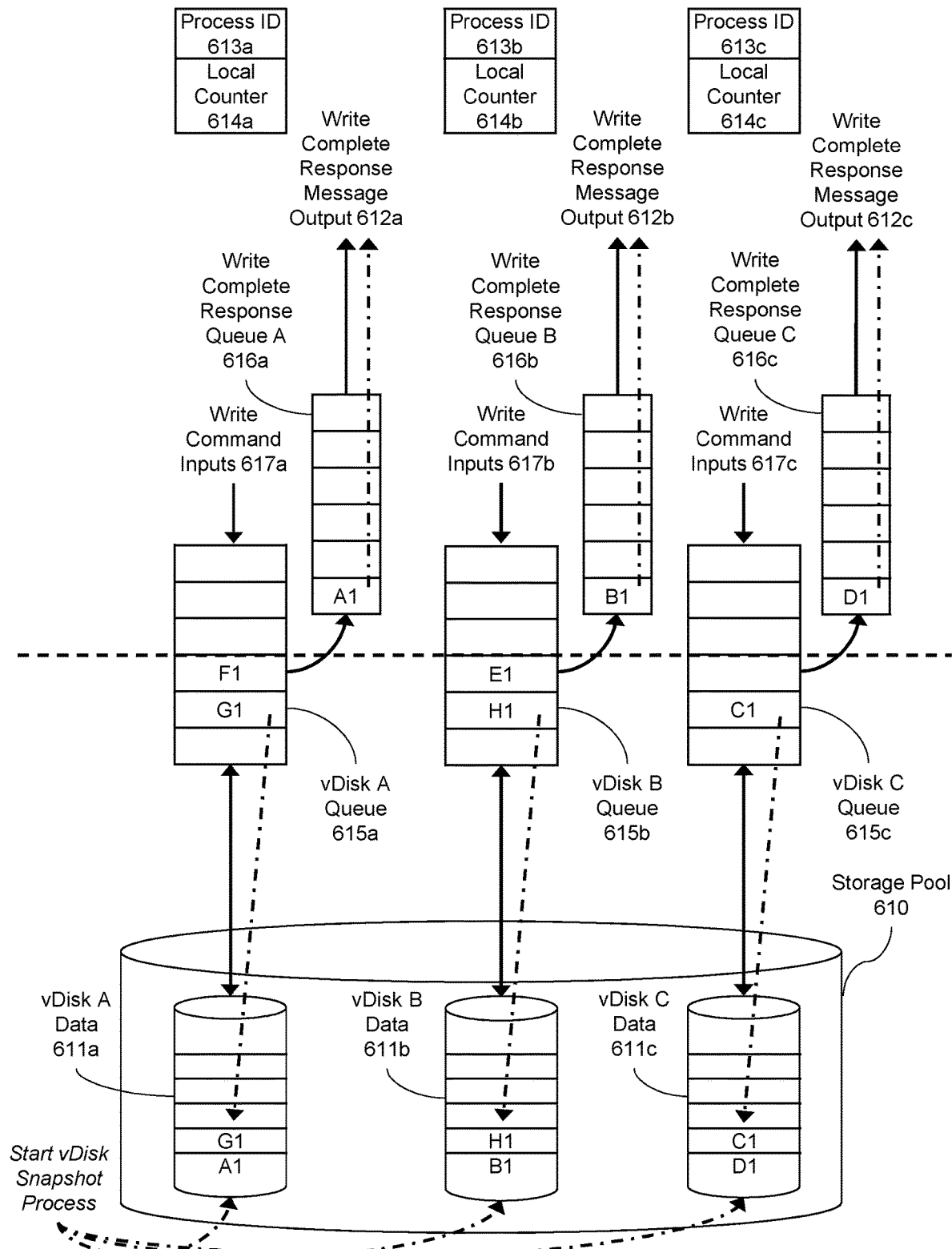

FIG. 6C illustrates continued operation of the identified items and the start of the snapshot generation. As illustrated in FIG. 6B the start command is received, the process ID is stored at each corresponding location (whether in a respective backup manager or a respective vDisk manager), respective local counters are started, and the write complete response messages are cutoff for not yet received write requests.

Subsequently, FIG. 6C illustrates the start of the snapshot generation process for the data of each vDisk (e.g. the generation of vectors representing the contents of the vDisks or the copying of data to a snapshot image). Furthermore, operations of the queue continue to function as illustrated. First, each queue continues to write corresponding data to the storage pool in locations corresponding to respective vDisks (see G1 being copied from 615a to 611a, H1 being copied from 615b to 611b, C1 being copied from 615c to 611c). Furthermore, the illustration includes write complete response message queues 616a-c and transmission of write complete response messages from the response message queues 612a-c to corresponding write requestors via write complete response message outputs 612a-c. Here, the write complete response messages correspond to A1, B1, and D1 being sent from queues 616a, 616b, and 616c respectively. Furthermore, A1, B1, and D1 all correspond to below the line writes (e.g. writes received before the write response cutoff).

Figure 6D:
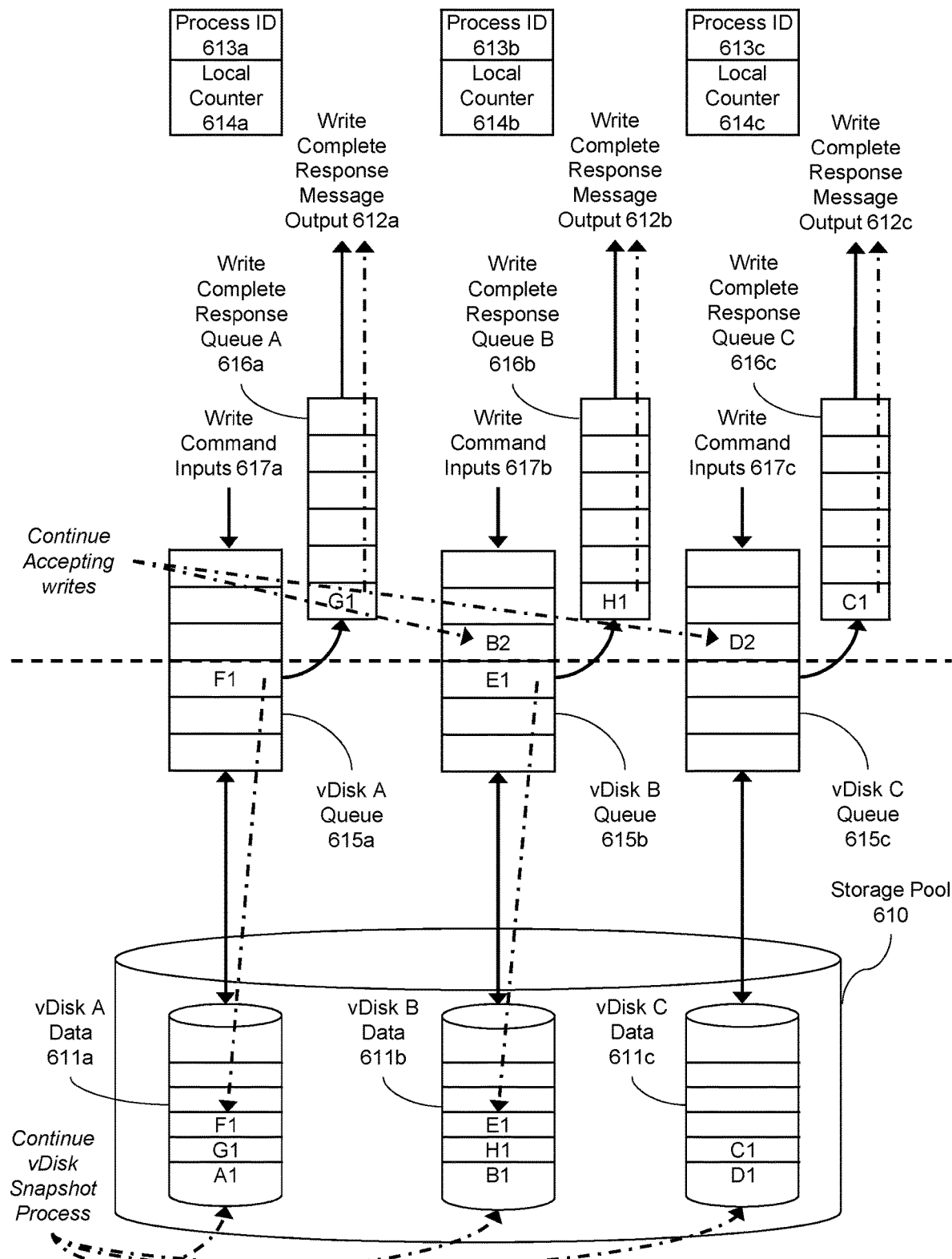

FIG. 6D provides illustration of further operation and of receipt of additional writes while the snapshots of the vDisks are being generated.

Queues 615a and 615b contain entries F1 and E1 respectively that are being copied from the vDisk queues 615a and 615b to vDisk data areas 611a and 611b respectively. Additionally, G1, H1, and C1 having been previously received before the write response cutoff and having been written to corresponding locations in the storage pool 610 are associated with write complete response messages in the write complete response queues 616a-c being transmitted to the requestor via the corresponding outputs at 612a-c.

Queues 615b and 615c both receive new write commands/requests (B2 and D2) from write command inputs 617b and 617c respectively. The newly received write commands are stored logically above the line. However, the placement/position within the queue may only logically correspond to enabled or not enabled write complete response messages. For instance, a SCN could be used, where no SCNs high then the identified cutoff point for each respective vDisk can be associated with a confirmation of a write until the cutoff has be lifted. In the alternative, each entry is associated with, or includes, a write complete response flag wherein the value of the flag corresponds to whether a write complete response message is allowed. Furthermore, the value of the flag may comprise a process ID, a pointer to a list of one or more process IDs, or to a Boolean value. As illustrated the newly received write commands depend on previously written data that has already been confirmed (see write complete response messages for B1 and D1 illustrated in FIG. 6C)— for the sake of illustration we presume that a subsequent write in the same series depends on the previous write for that series.

Figure 6E:
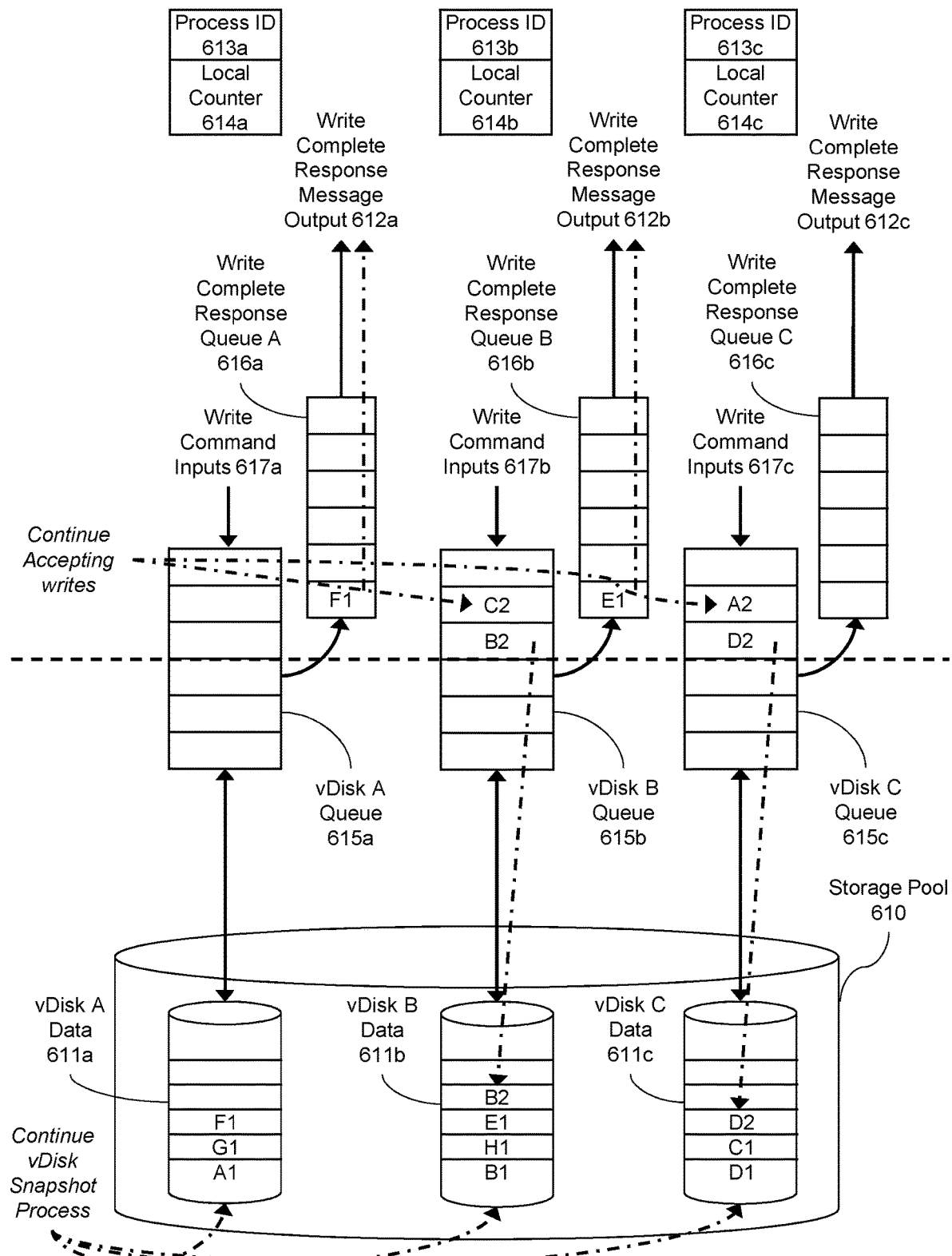

FIG. 6E provides illustration of further operation and of receipt of additional writes while the snapshots of the vDisks are being generated. Furthermore, FIG. 6E illustrates committing write request to the storage pool 610 even though the write requests are not currently enabled for write complete response messages.

Queues 615*b* and 615*c* both hold data being copied to corresponding vDisk storage locations 611*b* and 611*c* respectively (See B2 and D2). Additionally, Queues 615*b* and 615*c* accept/receive new write requests C2 and A2 respectively that depend on confirmed writes C1 and A1, where the completion is confirmed as illustrated in FIG. 6D and FIG. 6C respectively. Write complete response messages are output for F1 and E1 through write complete response message outputs 612*a* and 612*b* respectively. Here, F1 and E1 represent the last entries in the vDisk queues 615*a-c* that are currently enabled for write complete response messages.

Figure 6F:
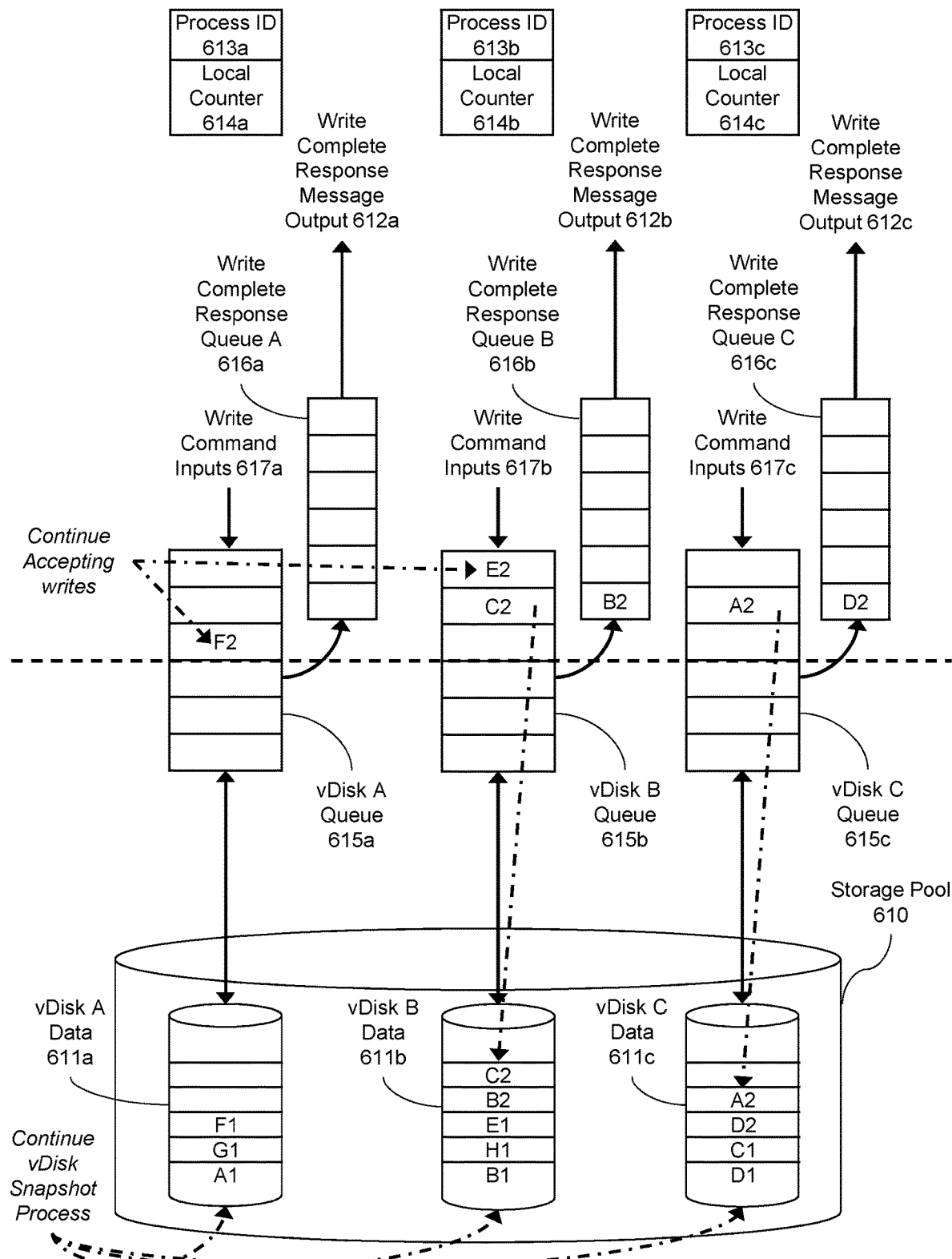

FIG. 6F provides illustration of further operation while the snapshots of the vDisks are being generated. Furthermore, FIG. 6F illustrates holding back write complete response messages enabled for above the line writes requests.

Queues 615*b* and 615*c* both hold data being copied to corresponding vDisk storage locations 611*b* and 611*c* respectively (See C2 and A2). Additionally, Queues 615*a* and 615*b* accept/receive new write requests F2 and E2 respectively that depend on confirmed writes F1 and E1, where the completion is confirmed as illustrated in FIG. 6E. Write complete response messages for B2 and D2 are added to the write complete response Queues 616*b* and 616*c* respectively. However as both writes correspond to above the line writes, the corresponding completion response messages are held in the queue and not sent to the requestor at this time. Additionally, because the write complete response messages are not transmitted for B2 and D2 no dependent writes will be received subsequently for those write requests—e.g. no B3 or D3 will be received.

Figure 6G:
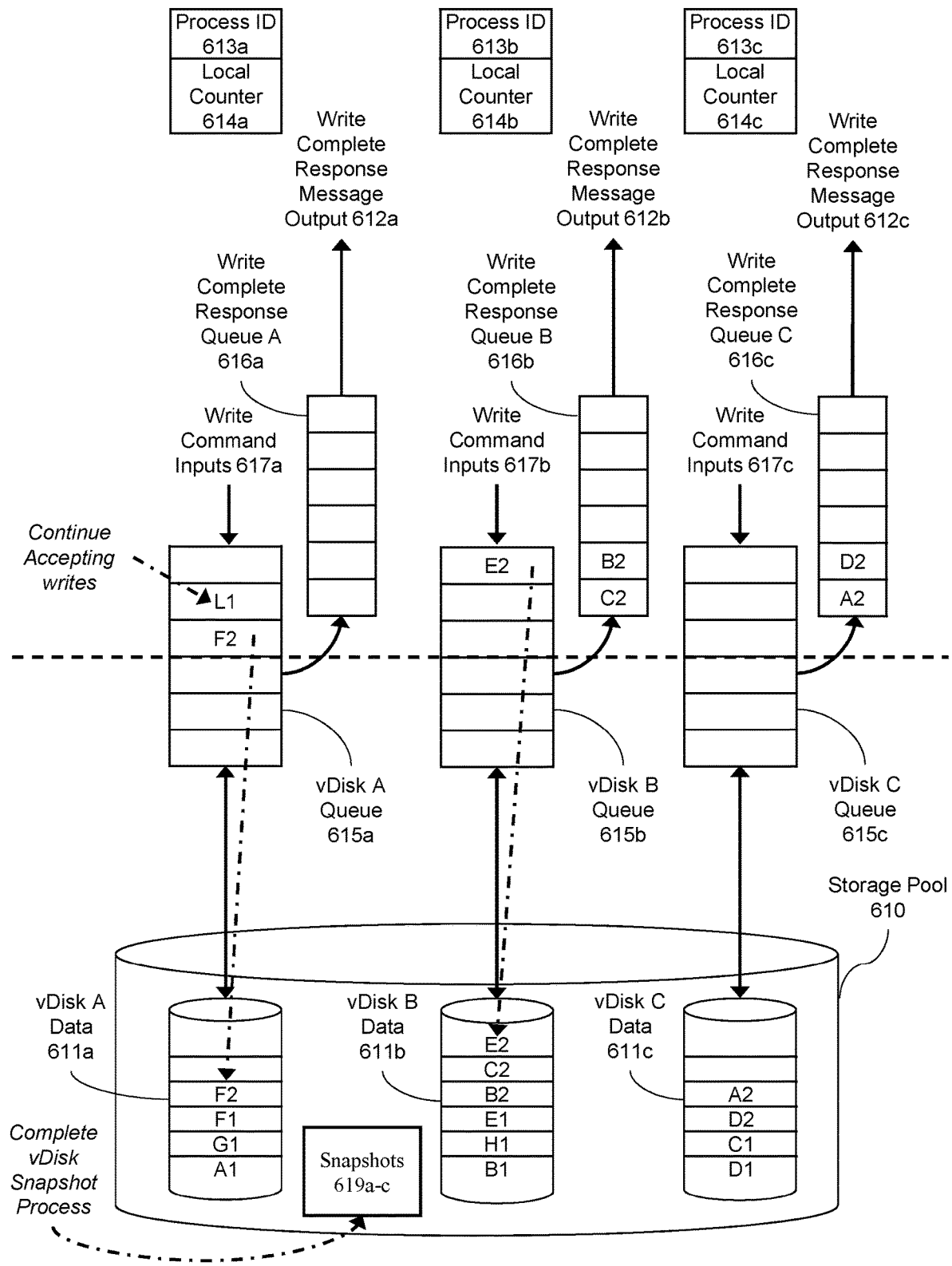

FIG. 6G provides illustration of further operation while the snapshots of the vDisks are being generated. Furthermore, FIG. 6G illustrates receipt of a first entry for a possible new series of entries.

Specifically, vDisk queue 615*a* receives write L1 that does not depend a previously received write. For example, L1 corresponds to a newly created document for a user at an application on a user VM (e.g. a new word document). Additionally, entries for C2 and A2 are added to response queues 616*ba* and 616*c* respectively, F2 and E2 are copied from vDisk queue 615*a* and 615*b* to corresponding locations in the storage pool 610. Furthermore, the snapshot generation process is completed at the level of the vDisks and stored on the storage pool 610 as snapshots 619*a-c*.

Figure 6H:
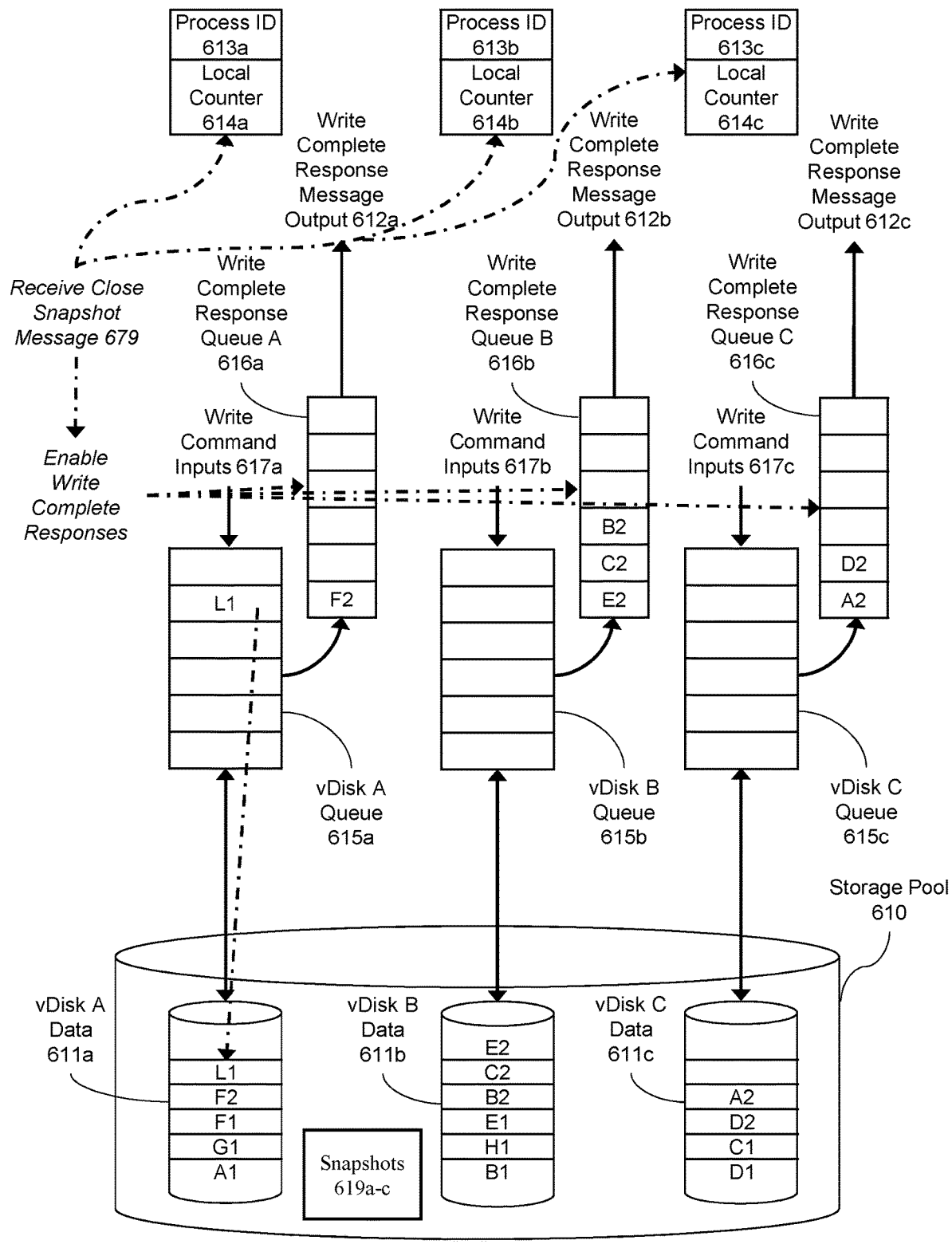

FIG. 6H illustrates the closing of the snapshot process and the re-enabling of the write complete response messages.

At 679, a close snapshot message is received including the previously provided process ID. This is used to verify that the previously started counters associated with the previously provided snapshot ID are still active and are not otherwise expired. Furthermore, the receipt of the close snapshot message also triggers the re-enabling of the write complete response messages associated with the process ID (see "Enable Write Complete Responses" to write complete response queues 616*a-c*). Additionally, the vDisk queues continue to operate as illustrated by the coping L1 from vDisk queue 615*a* to vDisk data area 611*a* in the storage pool 610.

Figure 6I:
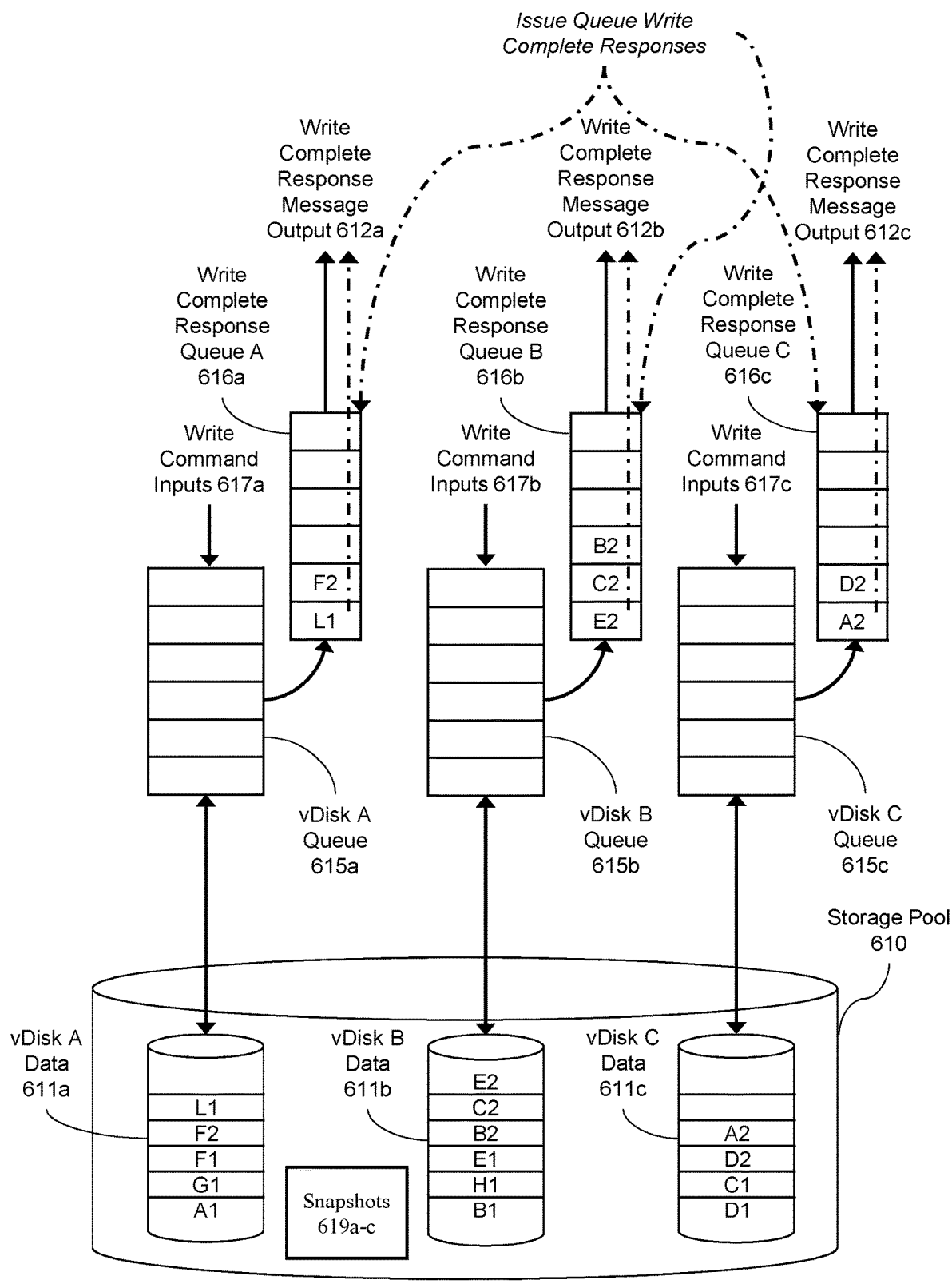

FIG. 6I, the last figure in the series, shows the issuance of the queued write complete responses. Specifically, write complete response queues 616*a-c* begin issuing the write complete response messages that were not issued for L1 and F2 at 616*a*, for E2, C2, and B2 at 616*b*, and for A2 and D2 at 616*c*.

SYSTEM ARCHITECTURE OVERVIEW

Additional System Architecture Examples

Figure 7A:
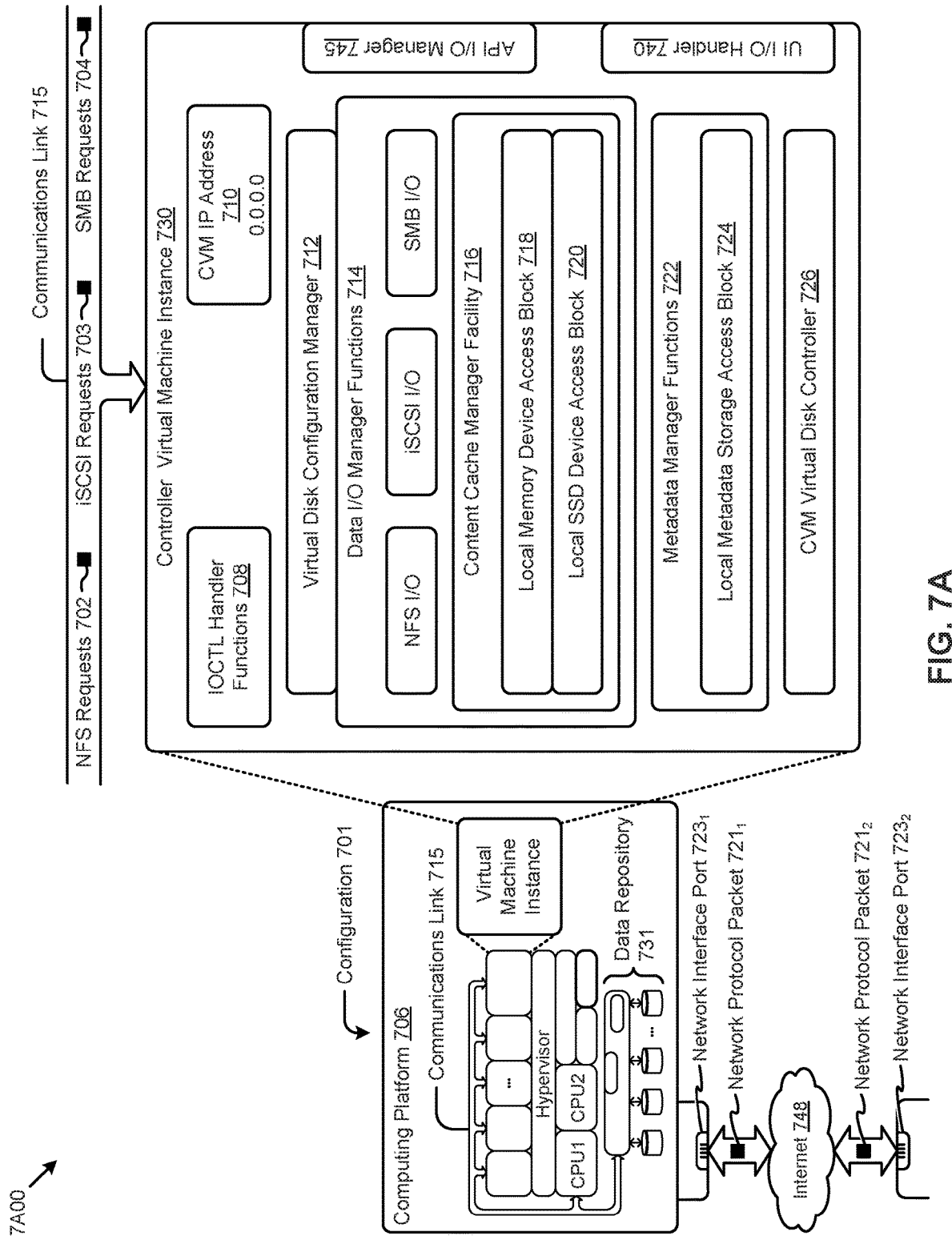
FIG. 7A and FIG. 7B depict architectures comprising collections of interconnected components suitable for implementing embodiments of the present disclosure and/or for use in the herein-described environments.

FIG. 7A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system requests (SMB) in the form of SMB requests 704. The controller virtual machine instance publishes and responds to an internet protocol (IP) address (e.g., see CVM IP address 710. Various forms of input and output (I/O or IO) can be handled by one or more IO control handler functions (see IOCTL functions 708) that interface to other functions such as data IO manager functions 714, and/or metadata manager functions 722. As shown, the data IO manager functions can include communication with a virtual disk configuration manager 712, and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes any non-volatile storage medium, for example, solid-state storage devices (SSD), or optical or magnetic disks such as disk drives or tape drives. Volatile media includes dynamic memory such as a random access memory. As shown, the controller virtual machine instance 730 includes a content cache manager facility 716 that accesses storage locations, possibly including local DRAM (e.g., through the local memory device access block 718) and/or possibly including accesses to local solid-state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731, can be configured using a CVM virtual disk controller 726, which can in turn manage any number or any configuration of virtual disks.

Execution of the sequences of instructions to practice certain embodiments of the disclosure are performed by one or more instances of a processing element such as a data processor, or such as a central processing unit (e.g., CPU1, CPU2). According to certain embodiments of the disclosure, two or more instances of configuration 701 can be coupled by a communications link 715 (e.g., backplane, LAN, PTSN, wired or wireless network, etc.) and each instance may perform respective portions of sequences of instructions as may be required to practice embodiments of the disclosure The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., see network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code), communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A first partition and second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of saving and restoring storage devices using application-consistent snapshots.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of saving and restoring storage devices using application-consistent snapshots). Such files or records can be brought into and/or stored in volatile or non-volatile memory.

Figure 7B:
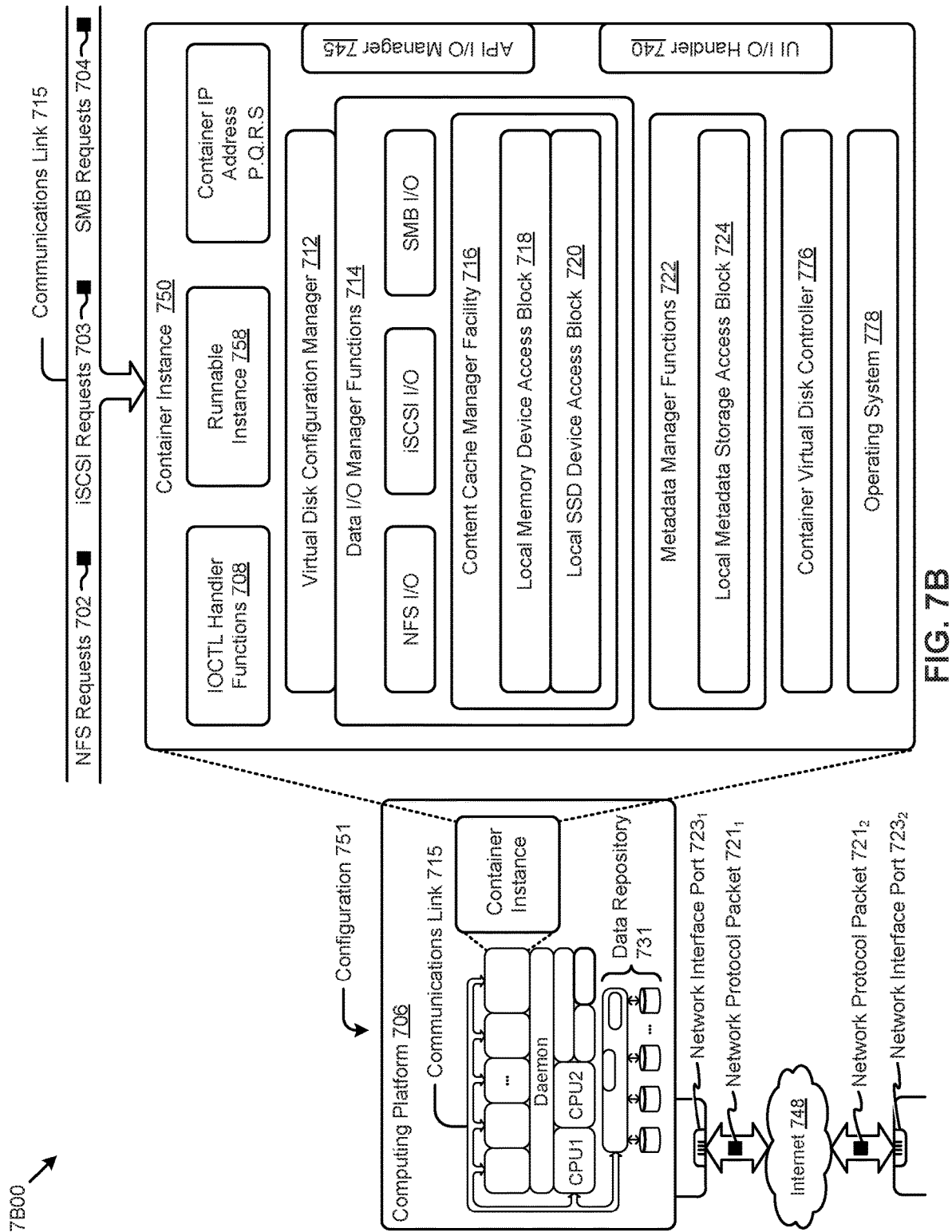

FIG. 7B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "1s" or "1s-a", etc.). The container might optionally include an operating system 778, however such an operating system need not be provided. Instead, a container can include a runnable instance 758, which is built (e.g., through compilation and linking, or just-in-time compilation, etc.) to include all the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 776. Such a container virtual disk controller can perform any of the functions that the CVM virtual disk controller 726, yet such a container virtual disk controller does not rely on a hypervisor or any particular operating system to perform its range of functions.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
    identifying a snapshot start event corresponding to a consistency group;
    in response to identifying the snapshot start event, generate a snapshot for the consistency group while write requests received after the snapshot start event are being serviced for the consistency group, by:
        disabling a write complete response message to a write request received after the snapshot start event to a resource of the consistency group;
        generating the snapshot for the consistency group while the write complete response message is disabled for the write request received after the snapshot start event to the resource of the consistency group;
        servicing the write request by writing data to a target storage location of the write request after disabling the write complete response message and before completing generation of the snapshot for the consistency group;
        enabling, after generation of the snapshot for the consistency group, the write complete response message for the write request received after the snapshot start event to the resource of the consistency group; and
        transmitting the write complete response message after enabling the write complete response message.

2. The method of claim 1, wherein write complete response messages are only disabled for the write requests received after the write complete response messages are disabled for writes to the consistency group.

3. The method of claim 1, further comprising sending a pending write complete response message to a source of the write request, where the pending write complete response message corresponds to a write request written to the target storage location during generation of the snapshot without transmitting a write request complete response to the source of the write request.

4. The method of claim 1, wherein the snapshot is committed if all members of the consistency group report success within a time period, and the snapshot is discarded if any members of the consistency group do not report success within the time period.

5. The method of claim 1, wherein the resource of the consistency group is accessible for reading by the consistency group during generation of the snapshot for the consistency group.

6. The method of claim 1, further comprising generating a process identifier (ID) for the snapshot start event, wherein the process ID corresponds to a snapshot process for the consistency group.

7. The method of claim 1, wherein a process ID for the snapshot start event is associated with a local timer at each node corresponding to the consistency group.

8. The method of claim 1, wherein members of the consistency group report success only when a respective local timer associated with a process ID has not expired.

9. The method of claim 1, wherein an expiration of a respective local timer associated with a process ID causes a corresponding node to generate a failure message, the failure message indicating a failure in the generation of the snapshot.

10. A non-transitory computer readable medium having stored thereon a sequence of instructions which, when executed by a processor causes a set of steps, the set of steps comprising:
    identifying a snapshot start event corresponding to a consistency group;
    in response to identifying the snapshot start event, generate a snapshot for the consistency group while write requests received after the snapshot start event are being serviced for the consistency group, by:
        disabling a write complete response message to a write request received after the snapshot start event to a resource of the consistency group;
        generating the snapshot for the consistency group while the write complete response message is disabled for the write request received after the snapshot start event to the resource of the consistency group;
        servicing the write request by writing data to a target storage location of the write request after disabling the write complete response message and before completing generation of the snapshot for the consistency group;
        enabling, after generation of the snapshot for the consistency group, the write complete response message for the write request received after the snapshot start event to the resource of the consistency group; and
        transmitting the write complete response message after enabling the write complete response message.

11. The computer readable medium of claim 10, wherein write complete response messages are only disabled for the write requests received after the write complete response messages are disabled for writes to the consistency group.

12. The computer readable medium of claim 10, wherein the set of steps further comprise sending a pending write complete response message to a source of the write request, where the pending write complete response message corresponds to a write request written to the target storage location during generation of the snapshot without transmitting a write request complete response to the source of the write request.

13. The computer readable medium of claim 10, wherein the set of steps further comprise committing the snapshot if all members of the consistency group report success within a time period, and discarding the snapshot if any members of the consistency group do not report success within the time period.

14. The computer readable medium of claim 10, wherein the sequence of instructions allow for the resource of the consistency group to remain accessible for reading by the consistency group during generation of the snapshot for the consistency group.

15. The computer readable medium of claim 10, wherein the set of steps further comprise generating a failure message at a node corresponding to a respective local timer associated with a process ID in response to an expiration of the respective local timer, the failure message indicating a failure in the generation of the snapshot.

16. The computer readable medium of claim 10, wherein the set of steps further comprise generating a process identifier (ID) for the snapshot start event, wherein the process ID corresponds to a snapshot process for the consistency group.

17. The computer readable medium of claim 10, wherein a process ID for the snapshot start event is associated with a local timer at each node corresponding to the consistency group.

18. The computer readable medium of claim 10, wherein the set of steps further comprise members of the consistency group reporting success only when a respective local timer associated with a process ID has not expired.

19. A system comprising:
   a storage medium having stored thereon a sequence of instructions; and
   a processor that executes the sequence of instructions to cause a set of acts comprising;
      identifying a snapshot start event corresponding to a consistency group;
      in response to identifying the snapshot start event, generate a snapshot for the consistency group while write requests received after the snapshot start event are being serviced for the consistency group, by:
      disabling a write complete response message to a write request received after the snapshot start event to a resource of the consistency group;
      generating the snapshot for the consistency group while the write complete response message is disabled for the write request received after the snapshot start event to the resource of the consistency group;
      servicing the write request by writing data to a target storage location of the write request after disabling the write complete response message and before completing generation of the snapshot for the consistency group;
      enabling, after generation of the snapshot for the consistency group, the write complete response message for the write request received after the snapshot start event to the resource of the consistency group; and
      transmitting the write complete response message after enabling the write complete response message.

20. The system of claim 19, wherein write complete response messages are only disabled for the write requests received after the write complete response messages are disabled for writes to the consistency group.

21. The system of claim 19, wherein the set of acts further comprise sending a pending write complete response message to a source of the write request, where the pending write complete response message corresponds to a write request written to the target storage location during generation of the snapshot without transmitting a write request complete response to the source of the write request.

22. The system of claim 19, wherein the set of acts further comprise committing the snapshot if all members of the consistency group report success within a time period, and discarding the snapshot if any members of the consistency group do not report success within the time period.

23. The system of claim 19, wherein the sequence of instructions allow for the resource of the consistency group to remain accessible for reading by the consistency group during generation of the snapshot for the consistency group.

24. The system of claim 19, wherein the set of acts further comprise generating a failure message at a node corresponding to a respective local timer associated with a process ID in response to an expiration of the respective local timer, the failure message indicating a failure in the generation of the snapshot.

25. The system of claim 19, wherein the set of acts further comprise generating a process identifier (ID) for the snapshot start event, wherein the process ID corresponds to a snapshot process for the consistency group.

26. The system of claim 19, wherein a process ID for the snapshot start event is associated with a local timer at each node corresponding to the consistency group.

27. The system of claim 19, wherein the set of acts further comprise members of the consistency group reporting success only when a respective local timer associated with a process ID has not expired.

* * * * *